US011301115B2

(12) United States Patent
Ding et al.

(10) Patent No.: US 11,301,115 B2
(45) Date of Patent: Apr. 12, 2022

(54) DETERMINING MOST RELEVANT ACCOUNTS IN A CONVERSATION

(71) Applicant: Twitter, Inc., San Francisco, CA (US)

(72) Inventors: Lisa Ding, San Francisco, CA (US); Jose Hernandez, San Francisco, CA (US); Hugo Broche, San Francisco, CA (US); Melissa Hribar, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/841,438

(22) Filed: Apr. 6, 2020

(65) Prior Publication Data

US 2020/0319758 A1 Oct. 8, 2020

Related U.S. Application Data

(60) Provisional application No. 62/829,611, filed on Apr. 4, 2019.

(51) Int. Cl.
*G06F 3/0482* (2013.01)
*H04L 12/58* (2006.01)
*H04L 51/00* (2022.01)

(52) U.S. Cl.
CPC .. *G06F 3/0482* (2013.01); *G06F 2203/04803* (2013.01); *H04L 51/16* (2013.01)

(58) Field of Classification Search
CPC ......... G06F 3/0482; G06F 2203/04803; H04L 51/16; H04L 51/04; G06Q 10/107; G06Q 50/01
See application file for complete search history.

(56) References Cited

U.S. PATENT DOCUMENTS

| 9,143,468 | B1* | 9/2015 | Cohen | G06F 16/9558 |
|---|---|---|---|---|
| 9,418,117 | B1* | 8/2016 | Molina | G06F 16/24578 |
| 9,449,050 | B1* | 9/2016 | Molina | G06F 16/24575 |
| 9,935,910 | B2* | 4/2018 | Zunger | H04L 51/24 |
| 10,073,926 | B2* | 9/2018 | Bastide | H04L 51/34 |
| 10,545,966 | B1* | 1/2020 | Molina | H04L 51/32 |
| 2014/0304622 | A1* | 10/2014 | Jorasch | H04L 12/1813 |
| | | | | 715/753 |
| 2015/0271248 | A1* | 9/2015 | O'Donnell | G06Q 30/0251 |
| | | | | 707/727 |
| 2016/0142358 | A1* | 5/2016 | Zunger | G06Q 10/107 |
| | | | | 709/206 |

(Continued)

*Primary Examiner* — Matthew Ell
*Assistant Examiner* — Kenny Nguyen
(74) *Attorney, Agent, or Firm* — Brake Hughes Bellermann LLP

(57) ABSTRACT

A computing device can receive at least a first post in association with a first account, a second post in association with the first account, the second post being associated with the first post, a third post in association with a second account, the third post being associated with the first post, a fourth post in association with the second account, the fourth post being associated with the first post, and a fifth post in association with a third account, the fifth post being associated with the first post, determine that the first account and the second account are most relevant to a conversation, and based on determining that the first account and the second account are most relevant to the conversation, present the first post, the second post, the third post, and the fourth post without presenting the fifth post.

18 Claims, 27 Drawing Sheets

(56) References Cited

U.S. PATENT DOCUMENTS

| | | | |
|---|---|---|---|
| 2017/0039296 A1* | 2/2017 | Bastide | H04L 51/34 |
| 2018/0159812 A1* | 6/2018 | Sarafa | H04L 51/04 |
| 2018/0205692 A1* | 7/2018 | Zunger | G06Q 50/01 |
| 2018/0337880 A1* | 11/2018 | Sokolov | H04N 21/6581 |
| 2019/0171693 A1* | 6/2019 | Dotan-Cohen | G06T 11/206 |
| 2019/0205449 A1* | 7/2019 | Erickson | G06F 16/285 |
| 2019/0327198 A1* | 10/2019 | Connor | H04L 51/32 |
| 2020/0104015 A1* | 4/2020 | Li | H04L 51/16 |

\* cited by examiner

DETERMINING MOST RELEVANT ACCOUNTS IN A CONVERSATION

CROSS-REFERENCE TO RELATED APPLICATION

This Application claims priority to U.S. Provisional Application No. 62/829,611, filed on Apr. 4, 2019, the disclosure of which is hereby incorporated by reference in its entirety.

TECHNICAL FIELD

This description relates to graphical user interfaces.

SUMMARY

According to an example, a non-transitory computer-readable storage medium comprising instructions stored thereon. When executed by at least one processor, the instructions can cause a computing device to receive at least a first post in association with a first account, a second post in association with the first account, the second post being associated with the first post, a third post in association with a second account, the third post being associated with the first post, a fourth post in association with the second account, the fourth post being associated with the first post, and a fifth post in association with a third account, the fifth post being associated with the first post, determining that the first account and the second account are most relevant to a conversation, the conversation including at least the first post, the second post, the third post, the fourth post, and the fifth post, and based on determining that the first account and the second account are most relevant to the conversation, present the first post, the second post, the third post, and the fourth post without presenting the fifth post.

According to an example, a method performed by a computing device can include receiving at least a first post in association with a first account, a second post in association with the first account, the second post being associated with the first post, a third post in association with a second account, the third post being associated with the first post, a fourth post in association with the second account, the fourth post being associated with the first post, and a fifth post in association with a third account, the fifth post being associated with the first post, determining that the first account and the second account are most relevant to a conversation, the conversation including at least the first post, the second post, the third post, the fourth post, and the fifth post, and based on determining that the first account and the second account are most relevant to the conversation, presenting the first post, the second post, the third post, and the fourth post without presenting the fifth post.

According to an example, a non-transitory computer-readable storage medium can include instructions stored thereon. When executed by at least one processor, the instructions can cause a computing device to present, within a conversation view, a first post and at least one other post, the first post including an identifier of an author of the first post and content provided by the author of the first post, receive a first selection of the first post within the conversation view, in response to receiving the first selection of the first post within the conversation view, present the first post within a selected state, at least one of the identifier of the author or the content being presented larger in the selected state than in the conversation view, receive a second selection of the first post within the selected state, and in response to receiving the second selection of the first post within the selected state, present a profile card associated with the author, the profile card including the identifier of the author and a description of the author.

The details of one or more implementations are set forth in the accompanying drawings and the description below. Other features will be apparent from the description and drawings, and from the claims.

DETAILED DESCRIPTION

Messaging applications can present messages from an original author and replies. The replies can be from the original author or from other users.

Figure 1A:
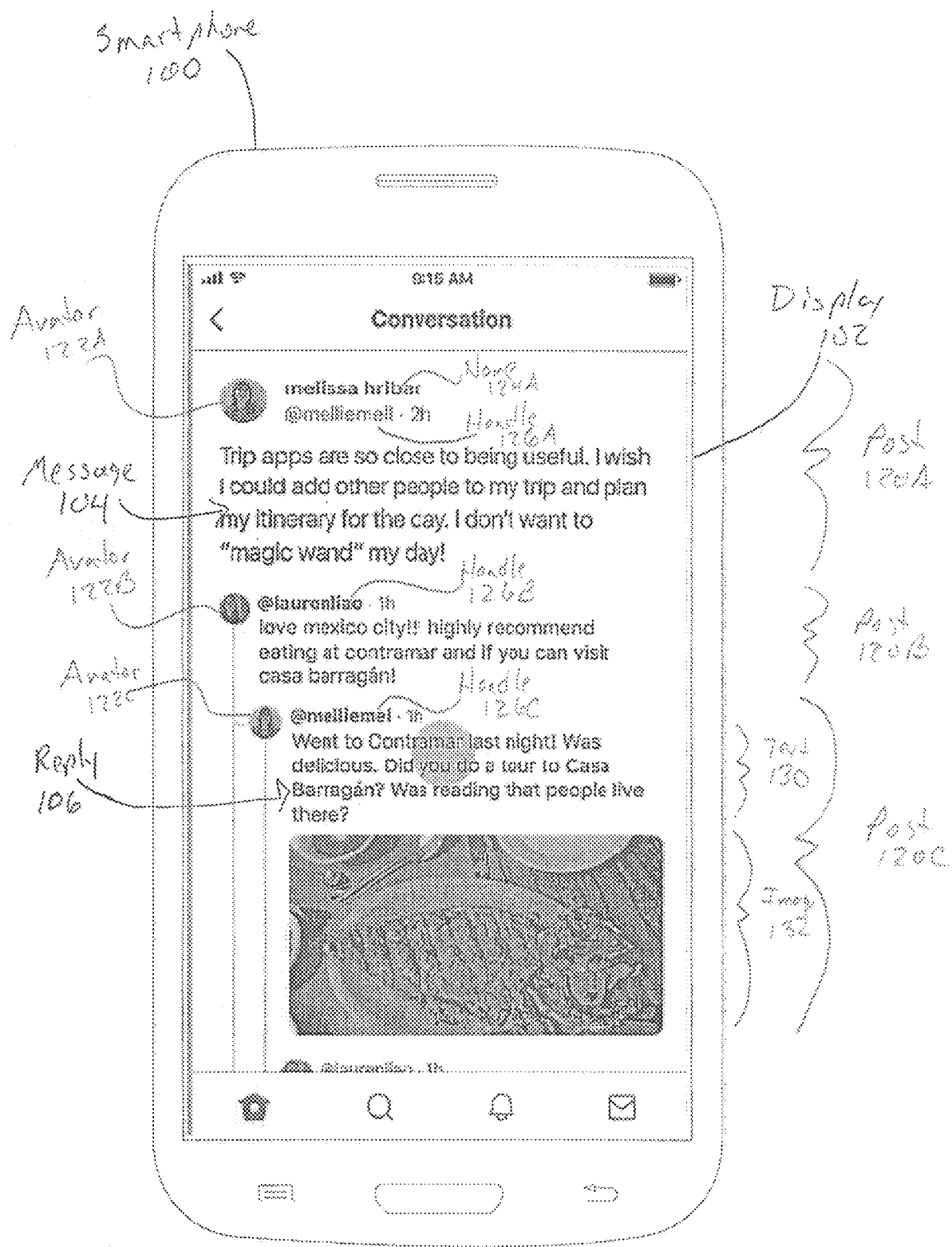
FIG. 1A shows a smartphone with a display presenting a conversation graphical user interface (GUI) according to an example implementation.

FIG. 1A shows a smartphone 100 with a display 102 presenting a conversation graphical user interface (GUI) according to an example implementation. The smartphone 100 is an example of a client device and/or computing device. The conversational GUI can present a message 104 from the original author and a reply 106 to the original message 106. The message 104 can be an example of a post 120A. The reply 106 can be an example of a post 120C that is responsive to a preceding post 120A, 120B.

The message 104 can be one of multiple posts 120A, 120B, 120C presented by the display 102. The posts 120A, 120B, 120C can each include an avatar 122A, 122B, 122C. The avatars 122A, 122B, 122C can include images selected, generated, and/or uploaded by users and/or authors associated with respective accounts that created and/or uploaded the posts 120A, 120B, 120B to a server 702 (described below).

The posts 120A, 120B, 120C can each include an identifier of an author of the respective post 120A, 120B, 120C and/or account associated with the post. The author can be a user who maintains (e.g., owns) the account associated with the post 120A, 120B, 120C, such as the account that was logged into the smartphone, and/or another client device, when the post 120A, 120B, 120C was generated and/or uploaded to the server 702. The avatars 122A, 122B, 122C, which can be examples of identifiers of authors of the posts 120A, 120B, 120C, can either be unique or non-unique identifiers of the authors of the respective posts 120A, 120B, 120C.

The posts 120A, 120B, 120C can each include a handle 126A, 126B, 126C. The handles 126A, 126B, 126C can each include a string of characters uniquely associated with the author and/or account that created and/or uploaded the post 120C to the server 702. The handles 126A, 126B, 126C can be examples of identifiers of authors of the posts 120A, 120B, 120C. In the example shown in FIG. 1A, the first post 120A, and/or root post in a conversation that includes the posts 120A, 120B, 120C, can include a name 124A of the author of the post 120A.

The posts 120A, 120B, 120C can include content created and/or uploaded by client devices, such as the smartphone, to the server 702 in association with the respective accounts and/or authors. The content can include text and/or image(s). In the example shown in FIG. 1A, the content of the post 120A includes text provided by the author of the post 120A. In the example shown in FIG. 1A, the content of the post 120B includes text provided by the author of the post 120B. In the example shown in FIG. 1A, the content of the post 120C includes text 130 provided by the author of the post 120A and an image 132 provided by the author of the post 120C.

A user may desire to learn more about an author of one of the posts 120A, 120B, 120C, and/or to learn more about one of the posts 120A, 120B, 120C. In an example implementation, a user can select one of the posts 120A, 120B, 120C. The user can select one of the posts by, for example, providing input to a portion of the post 120A, 120B, 120C, such as the content including text 130 and/or an image 132, such as by tapping on the portion of the post 120A, 120B, 120C, hovering a cursor over the portion of the post 120A, 120B, 120C and clicking on a mouse or other human interface device, or scrolling through the posts 120A, 120B, 120C and selecting the chosen post 120A, 120B, 120C, as non-limiting examples. The smartphone 100 can respond to the selection of the post 120A, 120B, 120C by transitioning from the conversation view shown in FIG. 1A to presenting the selected post 120A, 120B, 120C in a selected state shown in FIG. 1B.

Figure 1B:
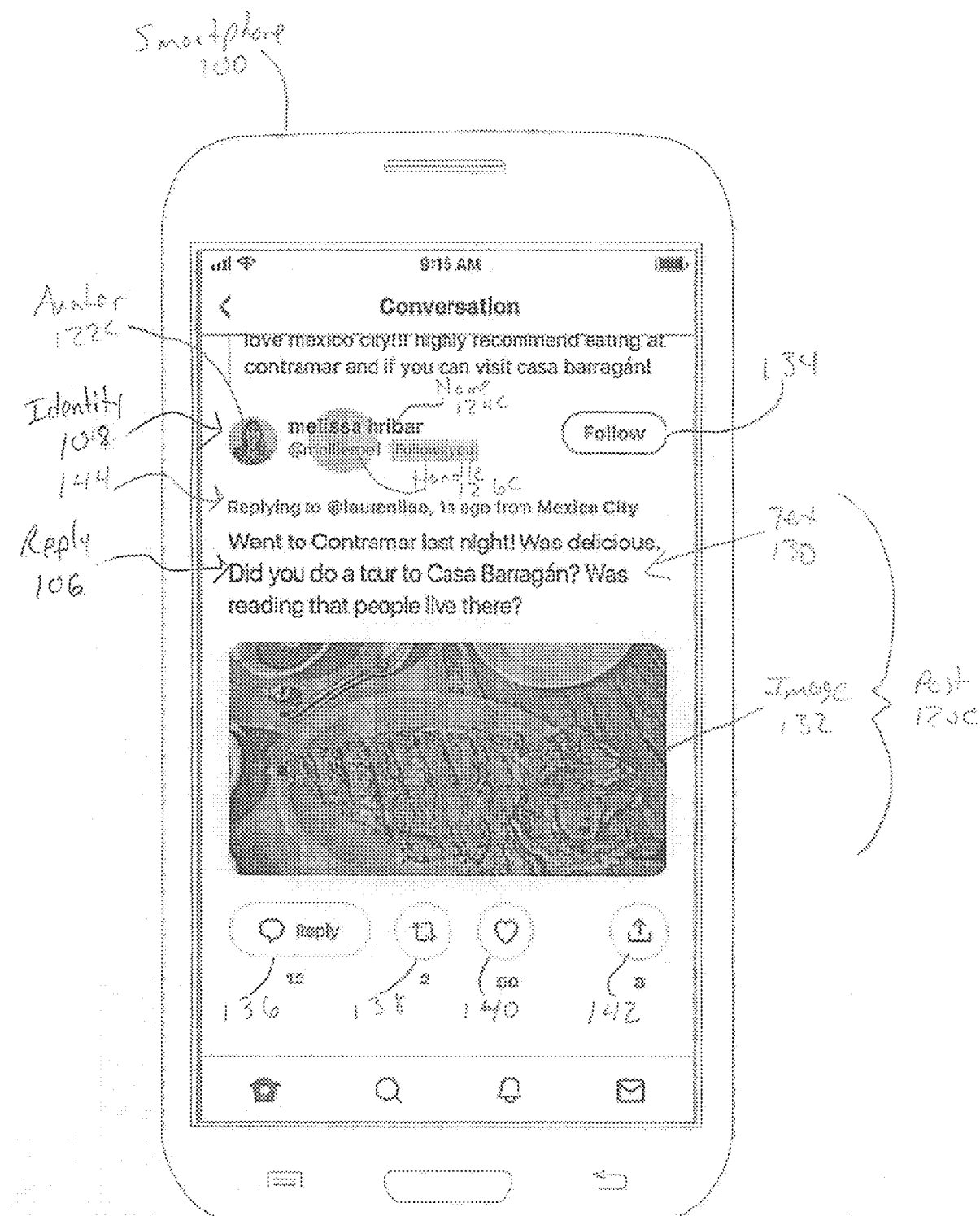
FIGS. 1B through 5D show the smartphone with the display presenting conversation GUIs according to example implementations.

FIG. 1B shows the smartphone 100 with the display 102 presenting a conversation GUI according to an example implementation. The conversational GUI can present an identity 108 of the author of the reply 106. The identity 108 can include an avatar associated with the author, a name of the author, and/or a handle of the author. The avatar can include a picture of the author or an image selected by the author. The handle can include a username or other identifier of the author. A user can click on the identity 108 to find out more information about the author of the reply 106.

The conversation GUI shown in FIG. 1B can be an example of a selected state presented by the smartphone in response to the user selecting the post 120C in the conversation view shown in FIG. 1A. In the selected state shown in FIG. 1B, at least one of the identifier of the author of the post 120C, such as the avatar 122C, a name 124C of the author of the post 120C, and/or the handle 126C, is presented larger, such as occupying a larger share of the display 102, than in the conversation view shown in FIG. 1A.

In some examples, the selected state can present additional information 144 about the post 120C that was not presented in the conversation view. In the example shown in FIG. 1B, the additional information 144 includes an explicit reference to the post 120B that the post 120C is replying to and/or responsive to, a time that the post 120C was generated and/or uploaded to the server 702, and/or a physical and/or geographical location from which the post 120C was generated and/or uploaded.

The smartphone 100 can present additional buttons in the selected state shown in FIG. 1B not presented in the conversation view shown in FIG. 1A. The smartphone 100 can present, for example, a reply button 136 enabling the user to generate and/or upload a post that replies to the post 120C, a repost button 138 to enable the user to repost the post 120C on the current user's account, a like or love button 140 enabling the user to indicate appreciation of the post 120C, and/or a share button 142 enabling the user to share the post 120C via an alternative electronic communication media such as a text message or email.

The user may desire to learn more about the author of the post 120C. The smartphone 100 can respond to the user selecting the post 120C in the selected state shown in FIG. 1B by presenting a profile card associated with the author of the post 120C. The user can select the post 120C by, for example, providing input to a portion of the post 120C, such as an identity 108 and/or identifier of the author such as the avatar 122C, name 124C, and/or handle 126C, such as by tapping on the portion of the post 120C, hovering a cursor over the portion of the post 120C and clicking on a mouse or other human interface device, or scrolling through the posts 120A, 120B, 120C and selecting the chosen post 120C, as non-limiting examples. The smartphone 100 can respond to the selection of the post 120C by transitioning from the selected state shown in FIG. 1B to presenting a profile card 110 shown in FIG. 1C.

Figure 1C:
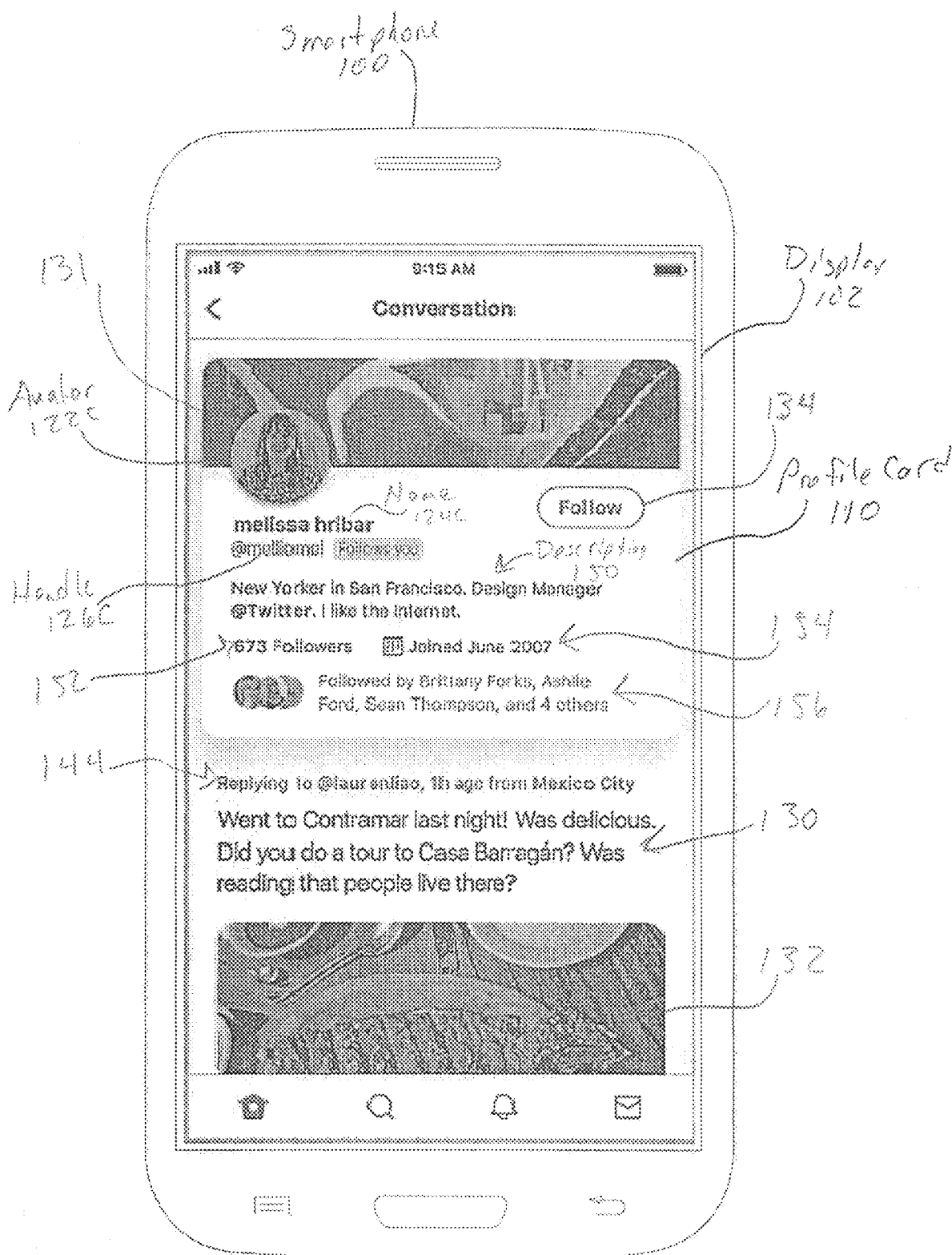

FIG. 1C shows the smartphone 100 with the display 102 presenting a conversation GUI according to an example implementation. In this example, the user has clicked on the identity 108 shown in FIG. 1B. The smartphone 100 has responded to the user clicking on the identity by generating, and/or causing the display 102 to present or display, a profile card 110. The profile card 110 presents more information than the identity 108. In the example shown in FIG. 1C, the profile card 110 presents a background image 131, the avatar 122 in a larger form than shown in the selected state of FIG. 1B, the author's name 124C, the author's handle 126C, a brief biography and/or description 150 of the author, a number of followers 152 of the author, a date 154 that the author joined the messaging application, and some names 156 of followers of the author.

In some examples, the smartphone 100 can return from presenting the profile card 110 shown in FIG. 1C to presenting the selected state shown in FIG. 1B in response to receiving first return input from the user. In some examples, the first return input can include input, such as tapping and/or clicking, on a portion of the display 102 that is outside the profile card 110.

In some examples, the smartphone 100 can return from presenting the selected state shown in FIG. 1B to presenting the conversation view shown in FIG. 1A in response to receiving second return input from the user. In some examples, the first return input can include input, such as tapping and/or clicking, on a portion of the display 102 that presents the content, such as the text 130 and/or image 132.

Figure 2A:
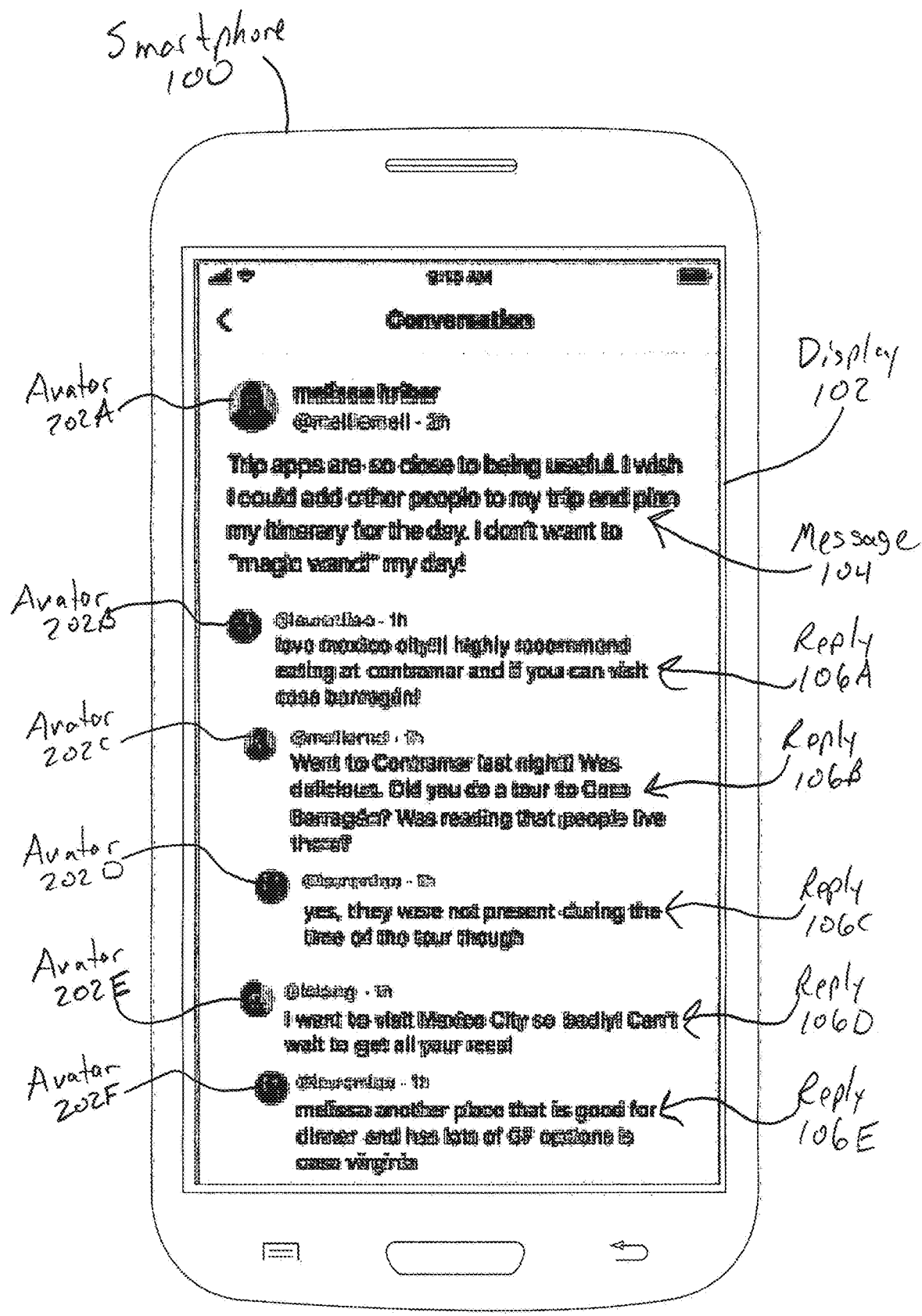

FIG. 2A shows the smartphone 100 with the display 102 presenting a conversation GUI according to an example implementation. In this example, the conversation GUI includes avatars 202A, 202B, 202C, 202D, 202E, 202F as anchors marking levels of indentation of the message 104 and replies 106A, 106B, 106C, 106D, 106E on the display 102.

Figure 2B:
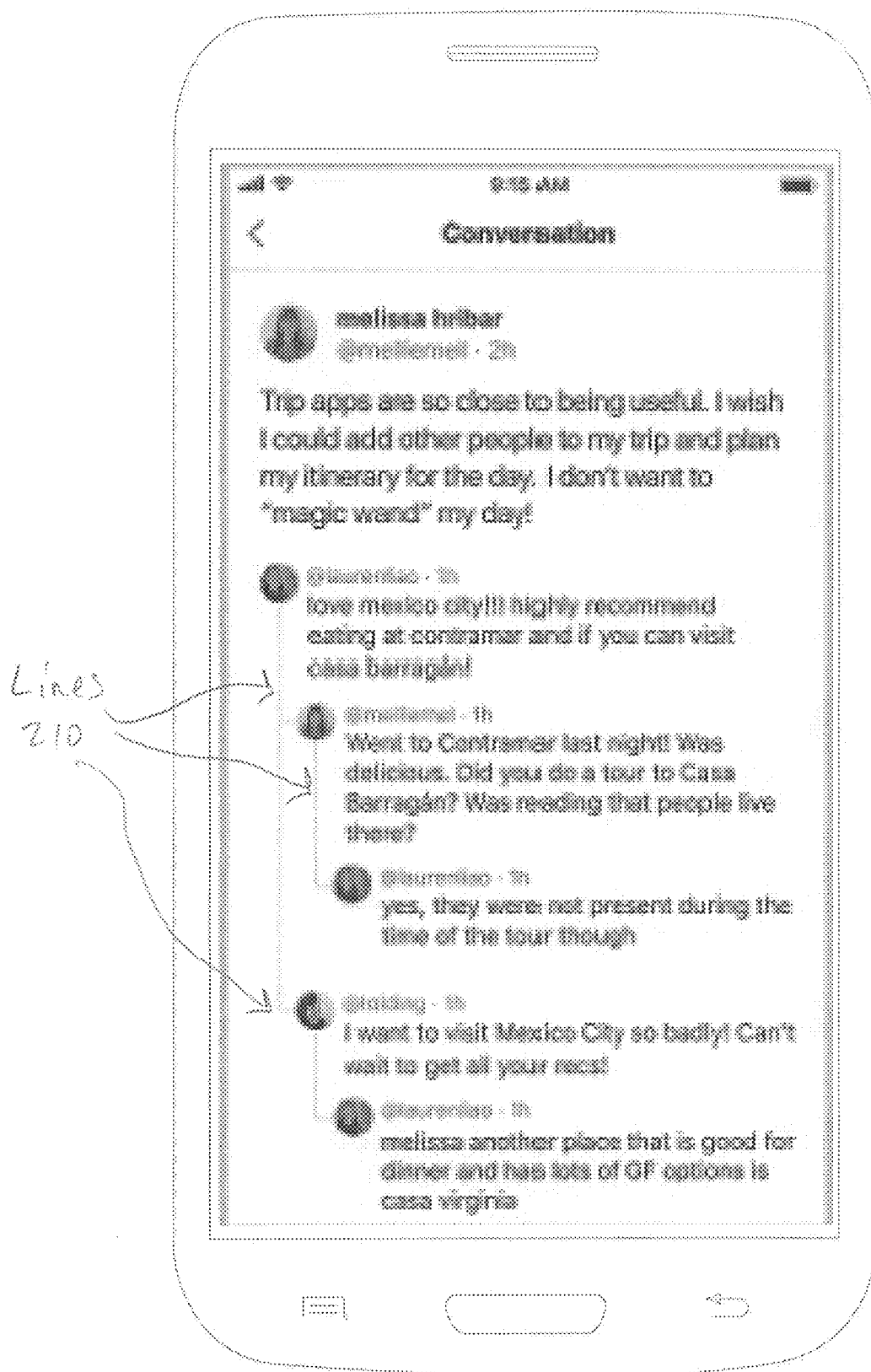

FIG. 2B shows the smartphone 100 with the display 102 presenting a conversation GUI according to an example implementation. In this example, lines 210 show relationships between replies 106A, 106B, 106C, 106D, 106E, indicating associations between replies 106A, 106B, 106C, 106D, 106E.

Figure 2C:
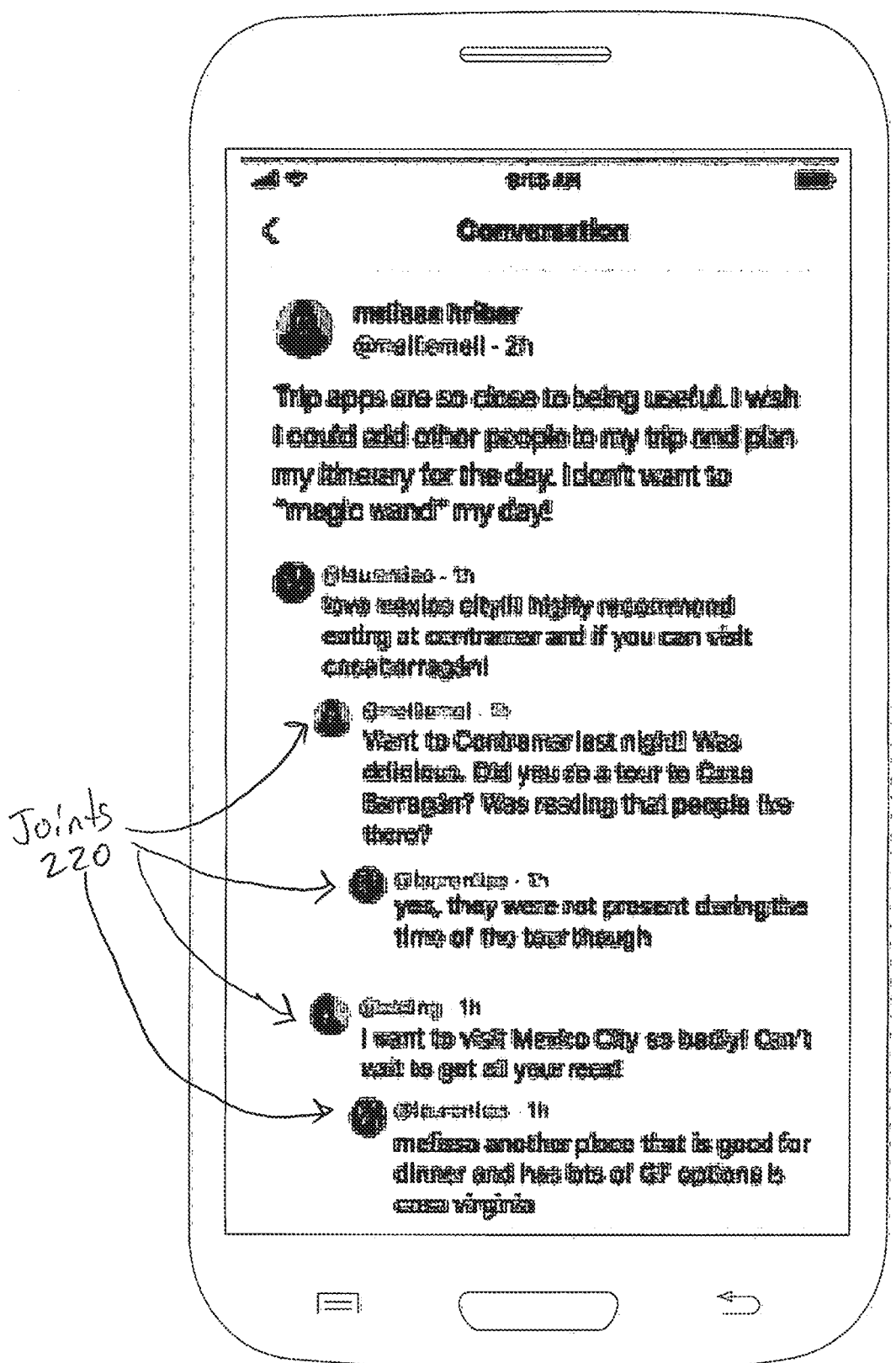

FIG. 2C shows the smartphone 100 with the display 102 presenting a conversation GUI according to an example implementation. In this example, curved joints 220 between the lines 210 and the replies 106A, 106B, 106C, 106D, 106E create a more fluid structure on the conversation GUI.

Figure 2D:
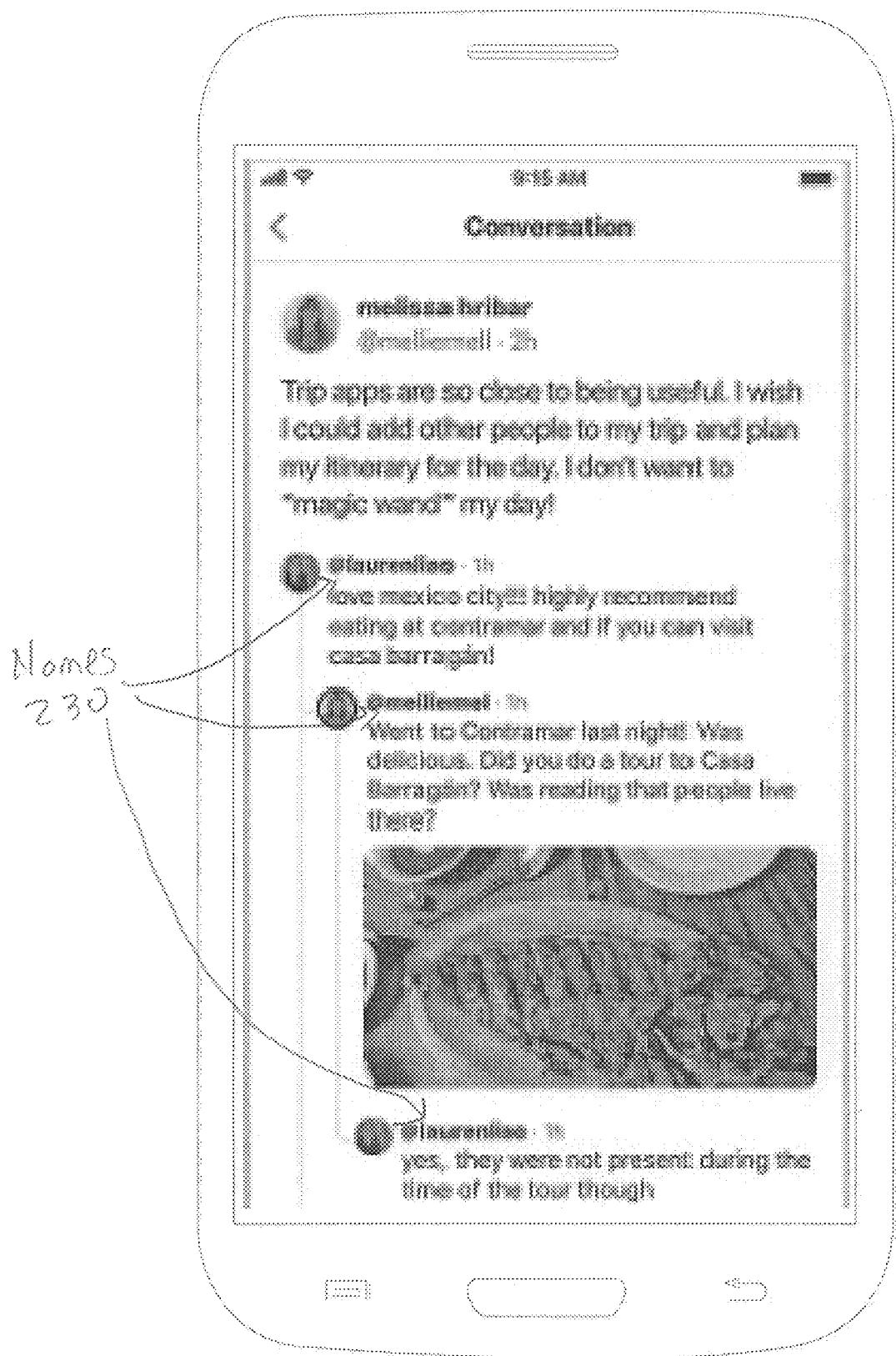

FIG. 2D shows the smartphone 100 with the display 102 presenting a conversation GUI according to an example implementation. In this example, the weight of the usernames 230 has been increased.

Figure 2E:
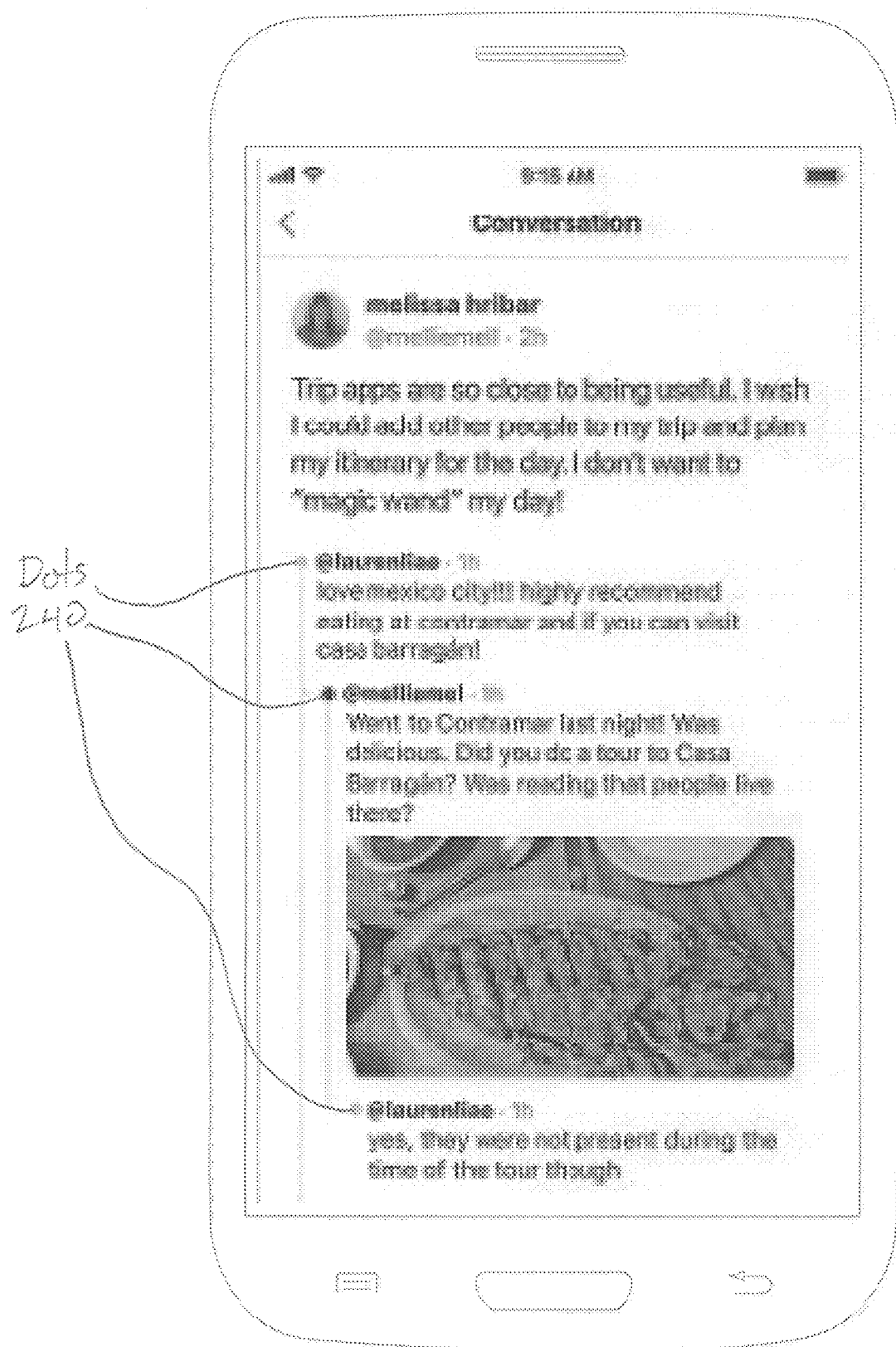

FIG. 2E shows the smartphone 100 with the display 102 presenting a conversation GUI according to an example implementation. In this example, dots 240 anchor the replies 106A, 106B, 106C, 106D, 106E. The dots 240 can be colored to indicate associations with other replies 106A, 106B, 106C, 106D, 106E.

Figure 2F:
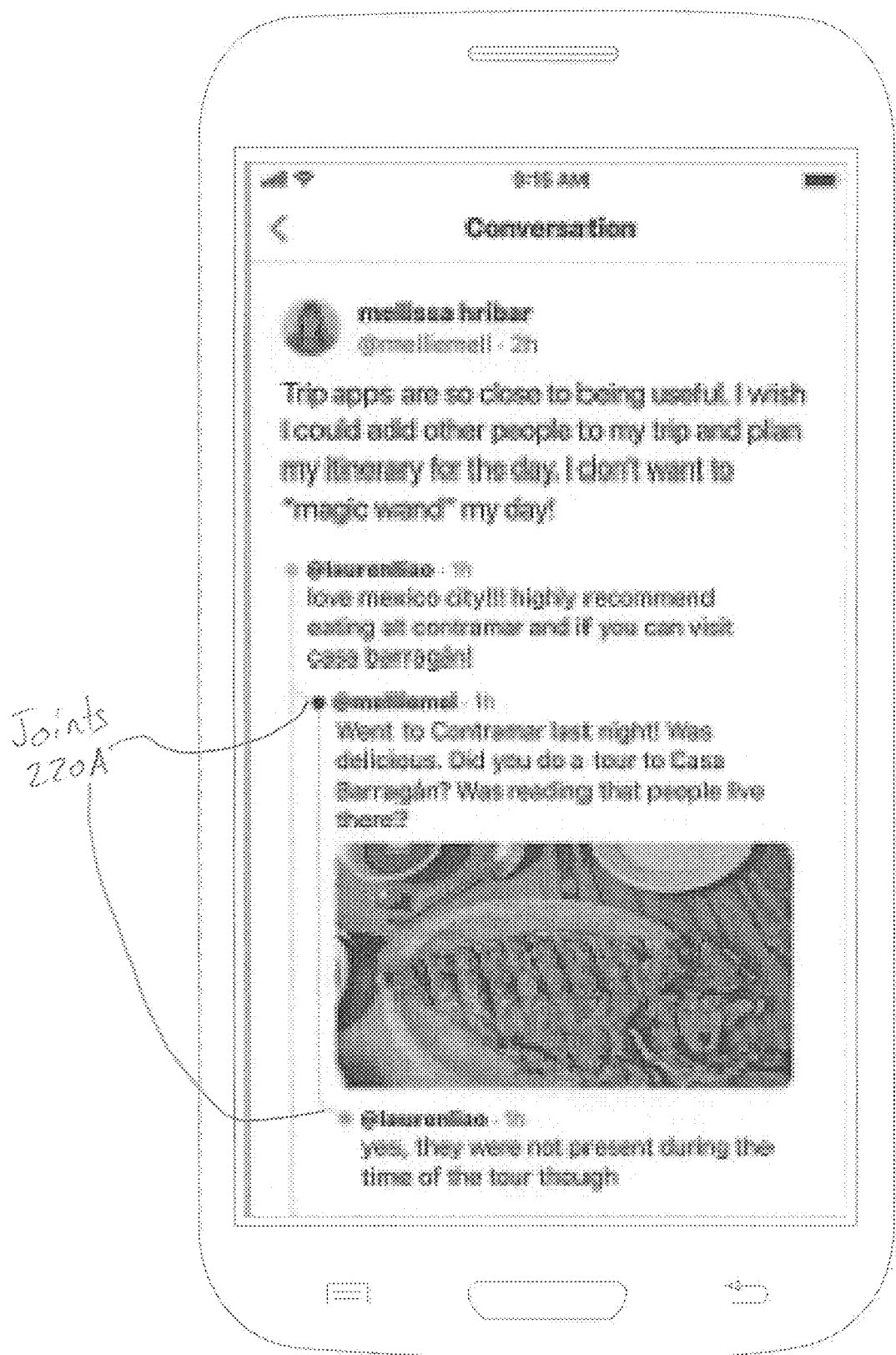

FIG. 2F shows the smartphone 100 with the display 102 presenting a conversation GUI according to an example implementation. In this example, the joints 220A indicating associations between the replies 106A, 106B, 106C, 106D, 106E are sloped.

Figure 3A:
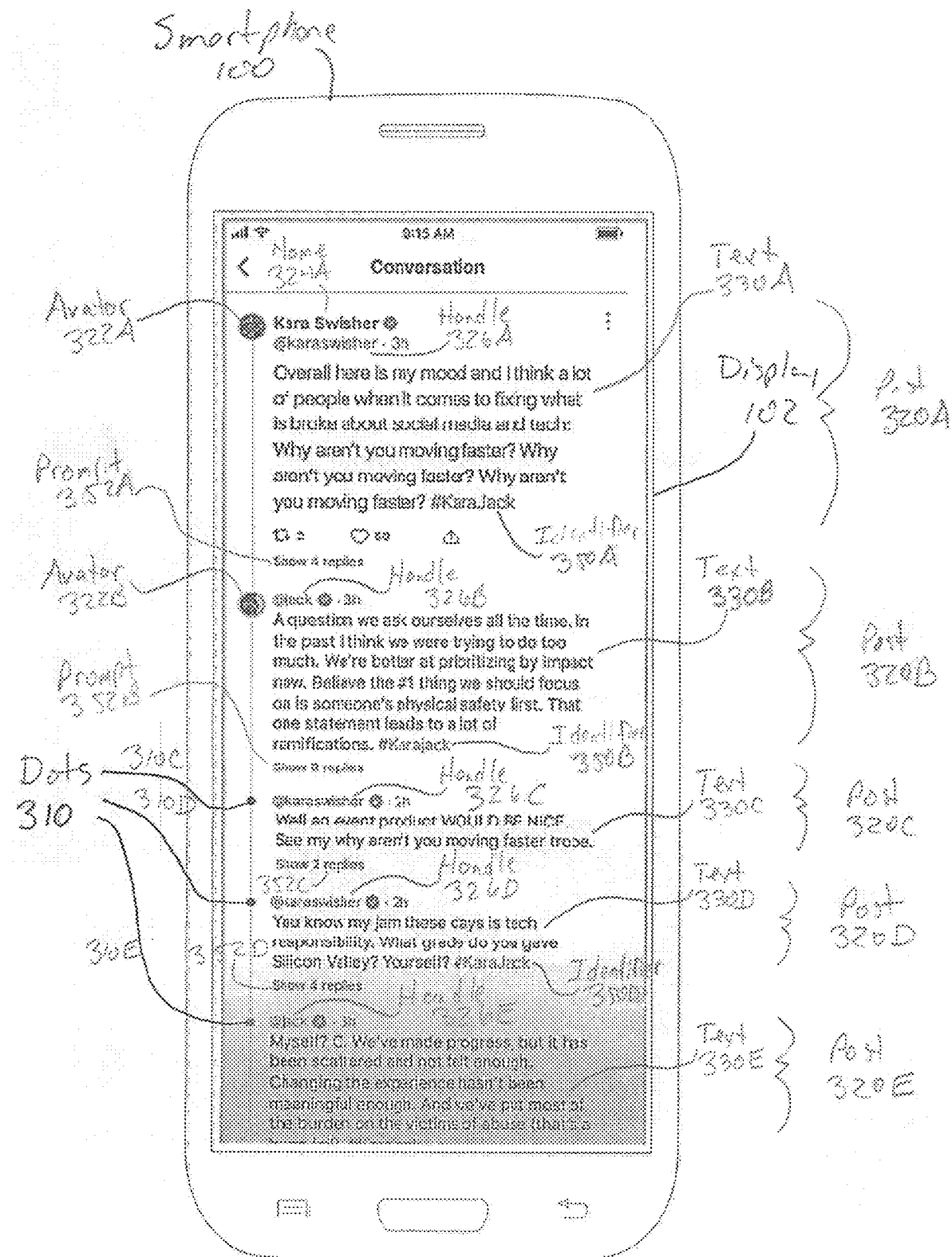

FIG. 3A shows the smartphone 100 with the display 102 presenting a conversation GUI according to an example implementation. In this example, dots 310 can demarcate the replies 106A, 106B, 106C, 106D, 106E. The dots 310 can be colored to indicate subsequent replies 106A, 106B, 106C, 106D, 106E.

In some examples, a computing device, such as the server 702 described below or client device 704 (of which the smartphone 100 is an example) described below, can receive multiple posts from multiple authors and/or associated with multiple accounts. The computing device can determine which accounts are most relevant to the conversation. In some examples, the computing device can determine that two accounts are most relevant to the conversation. Based on determining which accounts are most relevant to the conversation, the computing device can present only posts associated with and/or generated by the most relevant accounts, and/or present posts associated with and/or generated by the most relevant accounts without presenting posts associated with other accounts. In some examples, the computing device can present only posts associated with and/or generated by the most relevant accounts, and/or present posts associated with and/or generated by the most relevant accounts without presenting posts associated with other accounts, by presenting posts associated with other accounts only in response to an input and/or request by the user to present posts associated with other accounts.

In an example implementation, the computing device can receive a first post, such as a post displayed as post 320A, in association with a first account, a second post, such as a post displayed as post 320C, in associated with the first account, a third post, such as a post displayed as post 320B, in association with a second account, a fourth post, such as a post displayed as post 320E, in association with the second account, and a fifth post in association with a third account and which is not displayed in FIG. 3A. The second post, third post, fourth post, and fifth post can be associated with the first post by being in reply to and/or responsive to the first post. The computing device can determine that the first account and second account are most relevant to a conversation. The conversation, of which a portion is shown in FIG. 3A, can include the first post, second post, third post, fourth post, and fifth post based on the second post, third post, fourth, post, and fifth post being associated with the first post. Based on determining that the first account and the second account are most relevant to the conversation, the computing device can present the first post, the second post, the third post, and the fourth post without presenting the fifth post.

In the example shown in FIG. 3A, the first posts 320A, 320B by each of the two most relevant accounts and/or authors, first author Kara and second author Jack, include avatars 322A, 322B. In some examples, the avatar 322A, 322B of each author is surrounded by a different color, such as the avatar 322A being surrounded by a first color and the avatar 322B being surrounded by a second color, the second color being different than the first color. Subsequent posts 320C, 320D, 320E, and/or posts 320A, 320D, 320E that are below and/or after the first posts 320A, 320B, can include dots 310C, 310D, 310E with the two different colors instead of avatars to identify the authors of and/or accounts associated with the posts. In this example, the dot 310C included in the post 320C includes the first color to indicate that the post 320C is associated with the first author Kara, the dot 310D included in the post 320D includes the first color to indicate that the post 320D is associated with the first author Kara, and the dot 310E included in the post 320E includes the second color to indicate that the post 320E is associated with the second author Jack.

In the example shown in FIG. 3A, the text 330A, 330B, 330D included in the posts 320A, 320B, 320D includes identifiers 350A, 350B, 350D identifying the second account and/or second author Jack. The text 330A, 330B, 330D can include the identifiers 350A, 350B, 350D based on messages received by the server 702 that include the posts including the identifiers of authors and/or accounts other than the authors and/or accounts that generated the message and/or post. In some examples, the computing device can determine that the two authors and/or accounts Kara and Jack are the most relevant authors and/or accounts in the conversation based on the first post 320A in the conversation and/or root post 320A in the conversation, which was generated by the first author and/or account, including the identifier 350A identifying the second account and/or second author. In some examples, the computing device can determine that the two authors and/or accounts Kara and Jack are the most relevant authors and/or accounts in the conversation based on a threshold number and/or threshold proportion of post by the first author and/or account Kara identifying the second author and/or account Jack. In some examples, the computing device can determine that the two authors and/or accounts Kara and Jack are the most relevant authors and/or accounts in the conversation based on a threshold number and/or threshold proportion of posts by the first and second authors and/or accounts identifying the other author and/or account, such as posts by the first author and/or account identifying the second author and/or account and posts by the second author and/or account identifying the first author and/or account. In some examples, the computing device can determine that the two authors and/or accounts Kara and Jack are the most relevant authors and/or accounts in the conversation based on a threshold number and/or threshold proportion of posts included in the conversation identifying either the first author or the second author.

In some examples, the computing device can determine that the two authors and/or accounts Kara and Jack are the most relevant authors and/or accounts in the conversation based on a threshold number and/or threshold proportion of posts included in the conversation being associated with either the first author and/or account or the second author and/or account. In some examples, the computing device can determine that the two authors and/or accounts Kara and Jack are the most relevant authors and/or accounts in the conversation based on posts included in the conversation being by one of the two most relevant authors and/or accounts and responsive to and/or replying to posts by the other of the two most relevant authors and/or accounts, such as a threshold number and/or threshold proportion of all the posts included in the conversation being either posts by the first author and/or account replying to and/or responsive to posts by the second author and/or account, or posts by the second author and/or account replying to and/or responsive to posts by the first author and/or account.

In some examples, the computing device can present prompts, such as prompts 352A, 352B, 353C, 352D to display additional posts. The computing device can respond to input to the prompts 352A, 352B, 352C, 352D, such as taps and/or clicks on the prompts 352A, 352B, 352C, 352D by displaying additional posts, such as posts by authors and/or accounts other than the first author and/or account and second author and/or account that the computing device determined were most relevant to the conversation, such as presenting and/or displaying the fifth post by and/or associated with the third author and/or account.

Figure 3B:
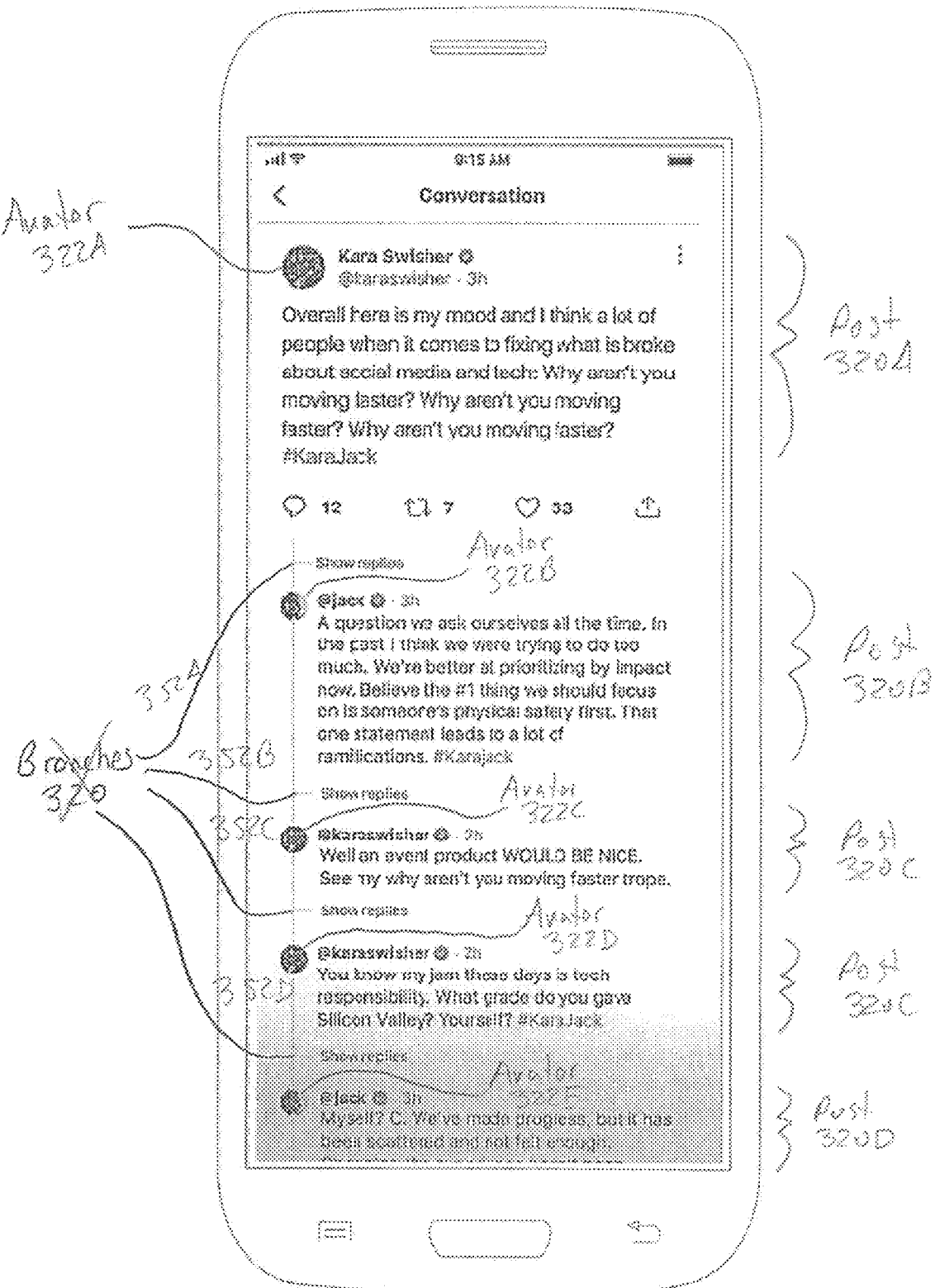

FIG. 3B shows the smartphone 100 with the display 102 presenting a conversation GUI according to an example implementation. In this example, branches 320 can indicate hidden replies. The conversation GUI can respond to a user clicking on the branches 320, and/or text ("Show replies") adjacent to the text, by presenting the hidden replies. FIG. 3B shows similar features as FIG. 3A, with avatars 322C, 322D, 322E included in the posts 320C, 320D, 320E instead of dots 310C, 320D, 320E.

Figure 4A:
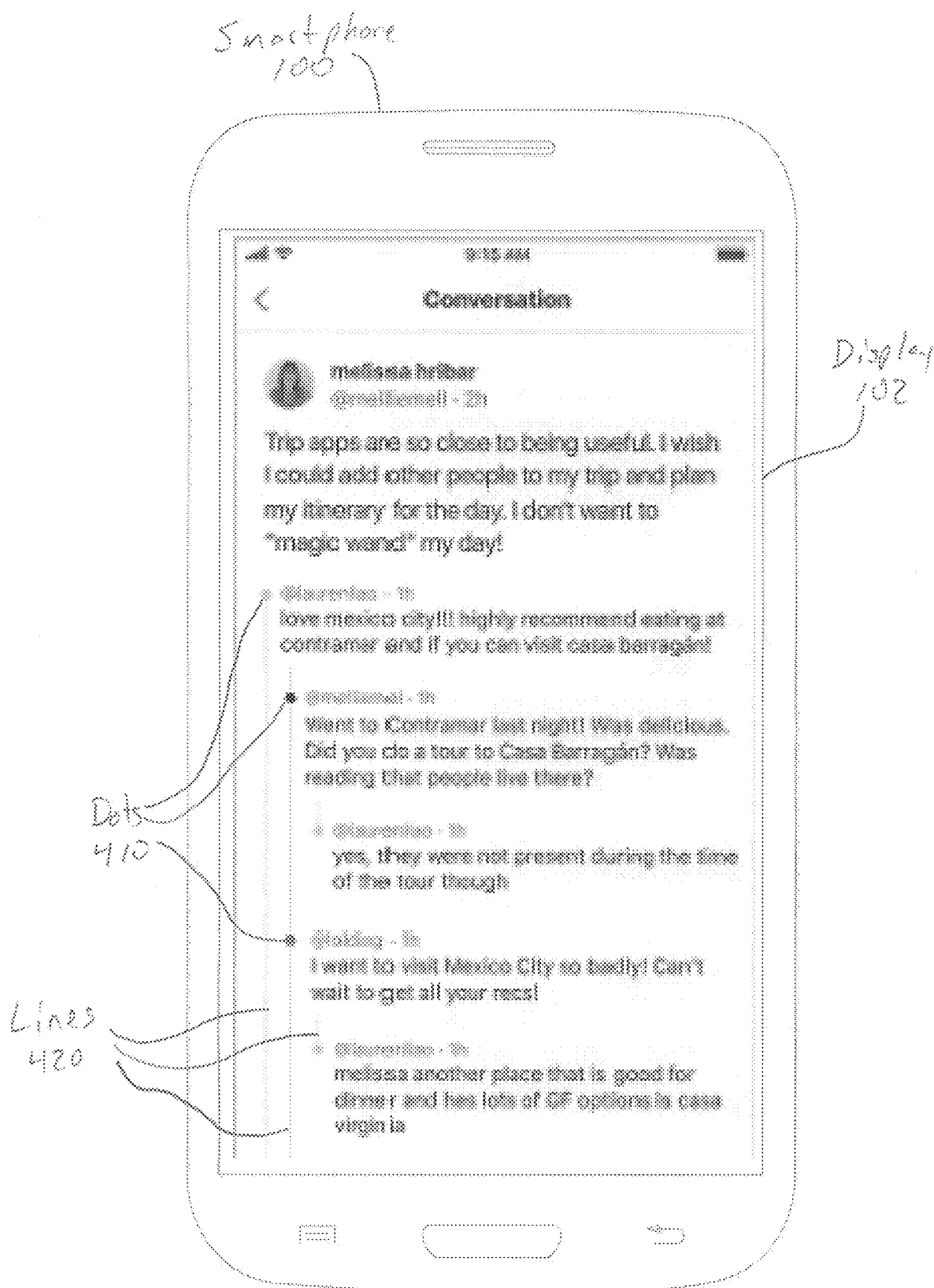

FIG. 4A shows the smartphone 100 with the display 102 presenting a conversation GUI according to an example implementation. In this example, dots 410 and lines 420 indicate relationships between replies 106A, 106B, 106C, 106D, 106E.

Figure 4B:
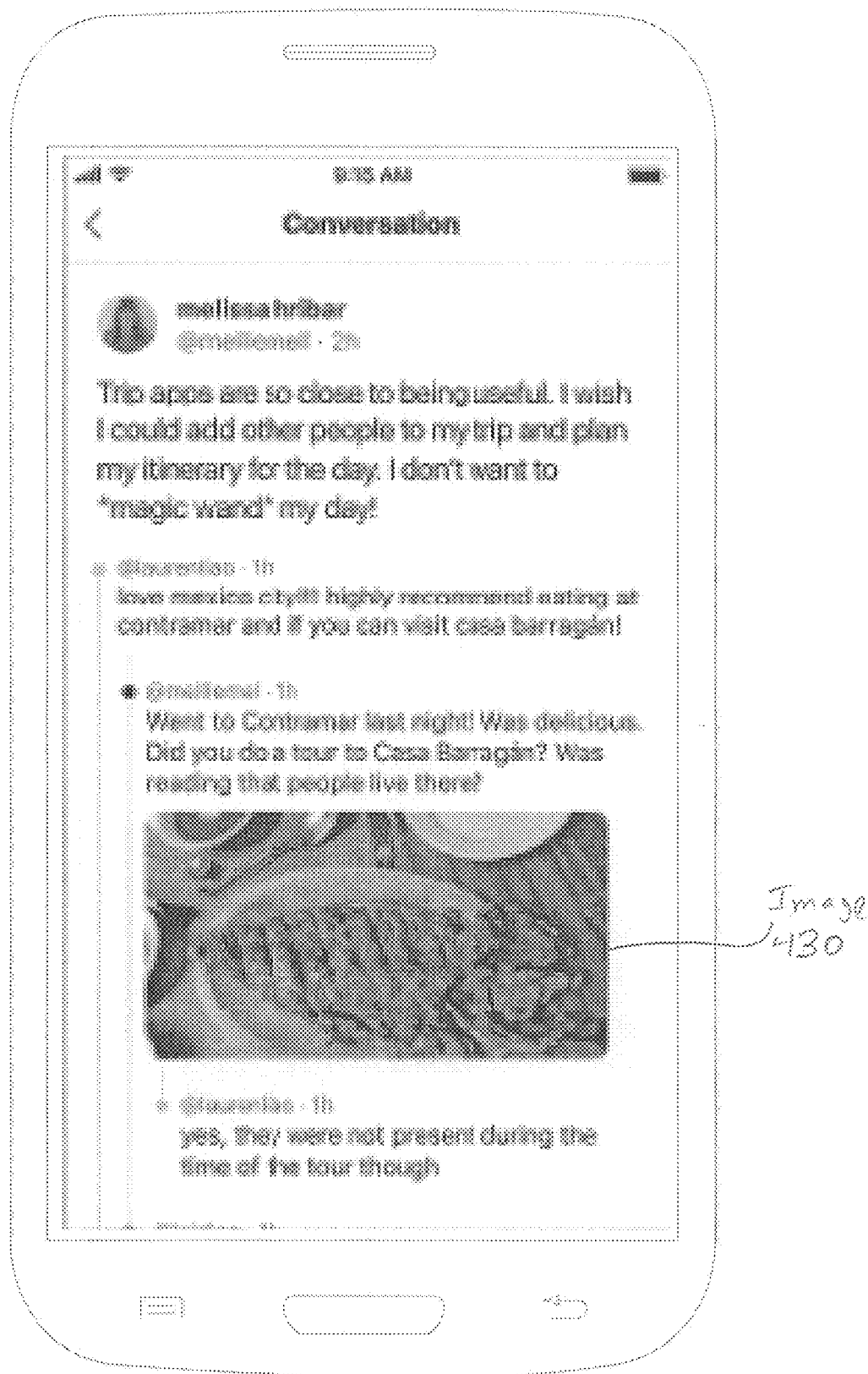

FIG. 4B shows the smartphone 100 with the display 102 presenting a conversation GUI according to an example implementation. In this example, an image 430 is included in one of the replies 106A, 106B, 106C, 106D, 106E.

Figure 4C:
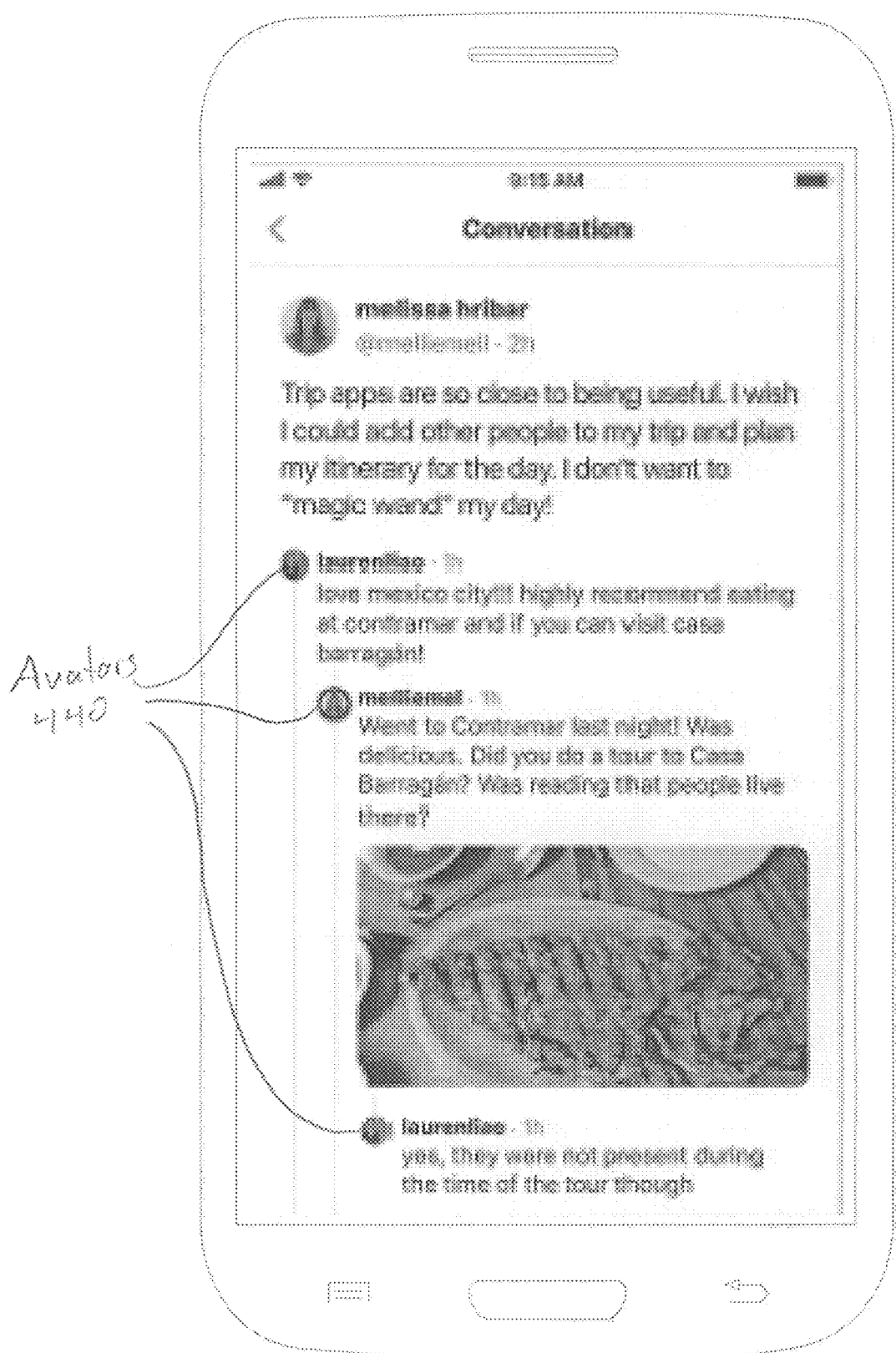

FIG. 4C shows the smartphone 100 with the display 102 presenting a conversation GUI according to an example implementation. In this example, the conversation GUI includes avatars 440 instead of dots 410 (shown in FIG. 4A) at indentation levels showing relationships between replies 106A, 106B, 106C, 106D, 106E.

Figure 4D:
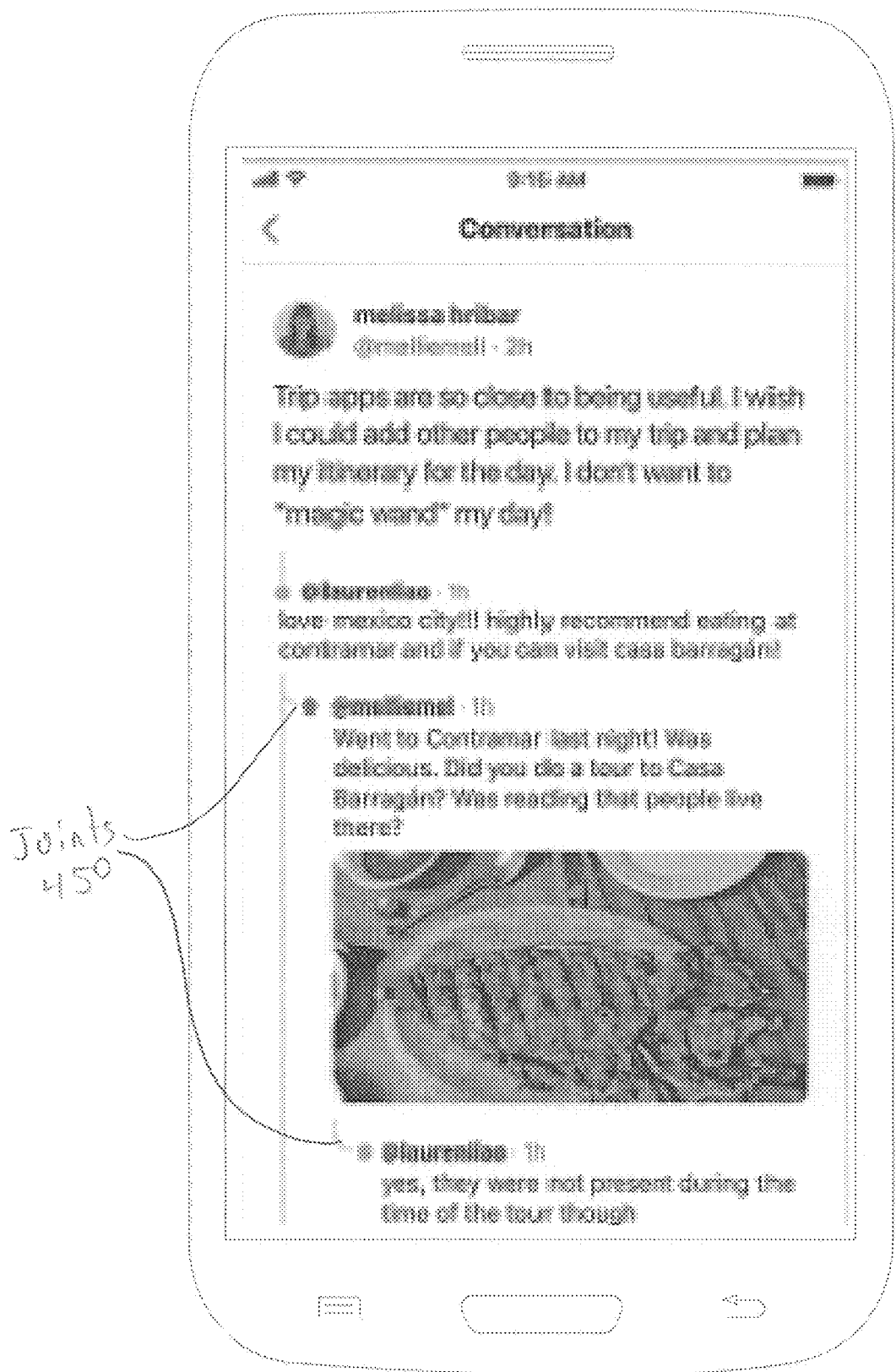

FIG. 4D shows the smartphone 100 with the display 102 presenting a conversation GUI according to an example implementation. In this example, curved joints 450 indicate associations between the replies 106A, 106B, 106C, 106D, 106E.

Figure 4E:
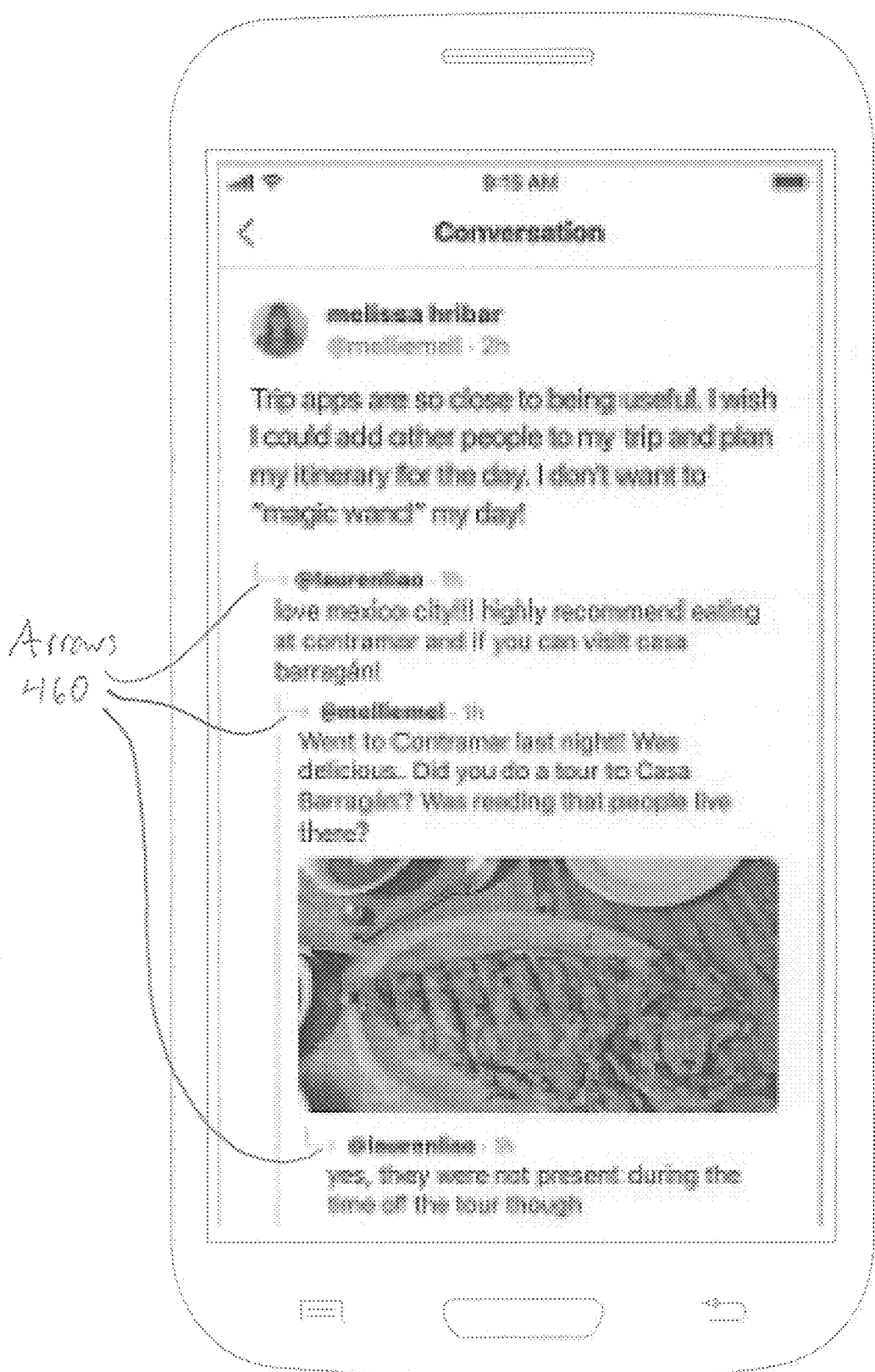

FIG. 4E shows the smartphone 100 with the display 102 presenting a conversation GUI according to an example implementation. In this example, arrows 460 indicate associations between the replies 106A, 106B, 106C, 106D, 106E.

Figure 4F:
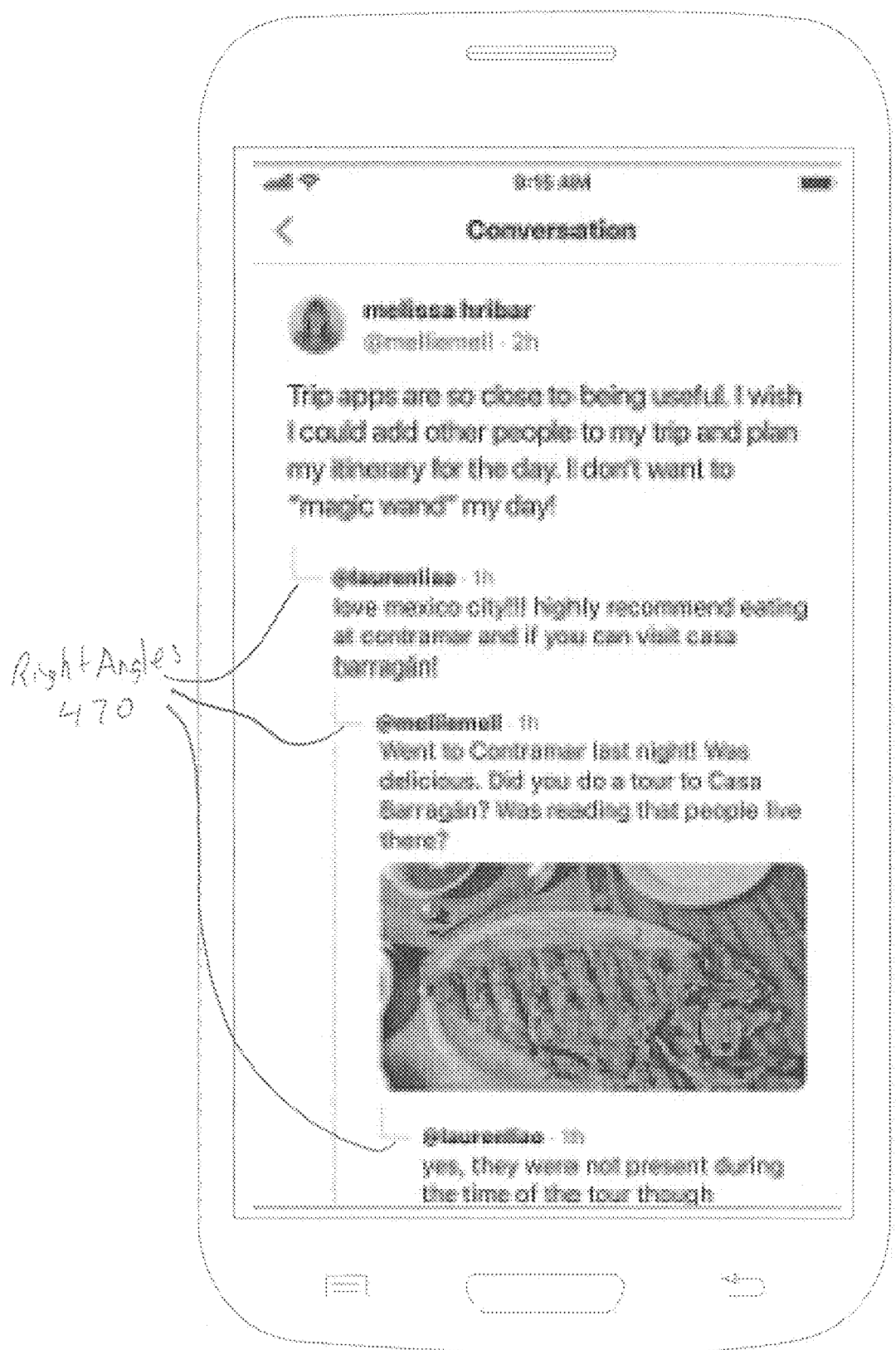

FIG. 4F shows the smartphone 100 with the display 102 presenting a conversation GUI according to an example implementation. In this example, right angles 460 indicate associations between the replies 106A, 106B, 106C, 106D, 106E.

Figure 5A:
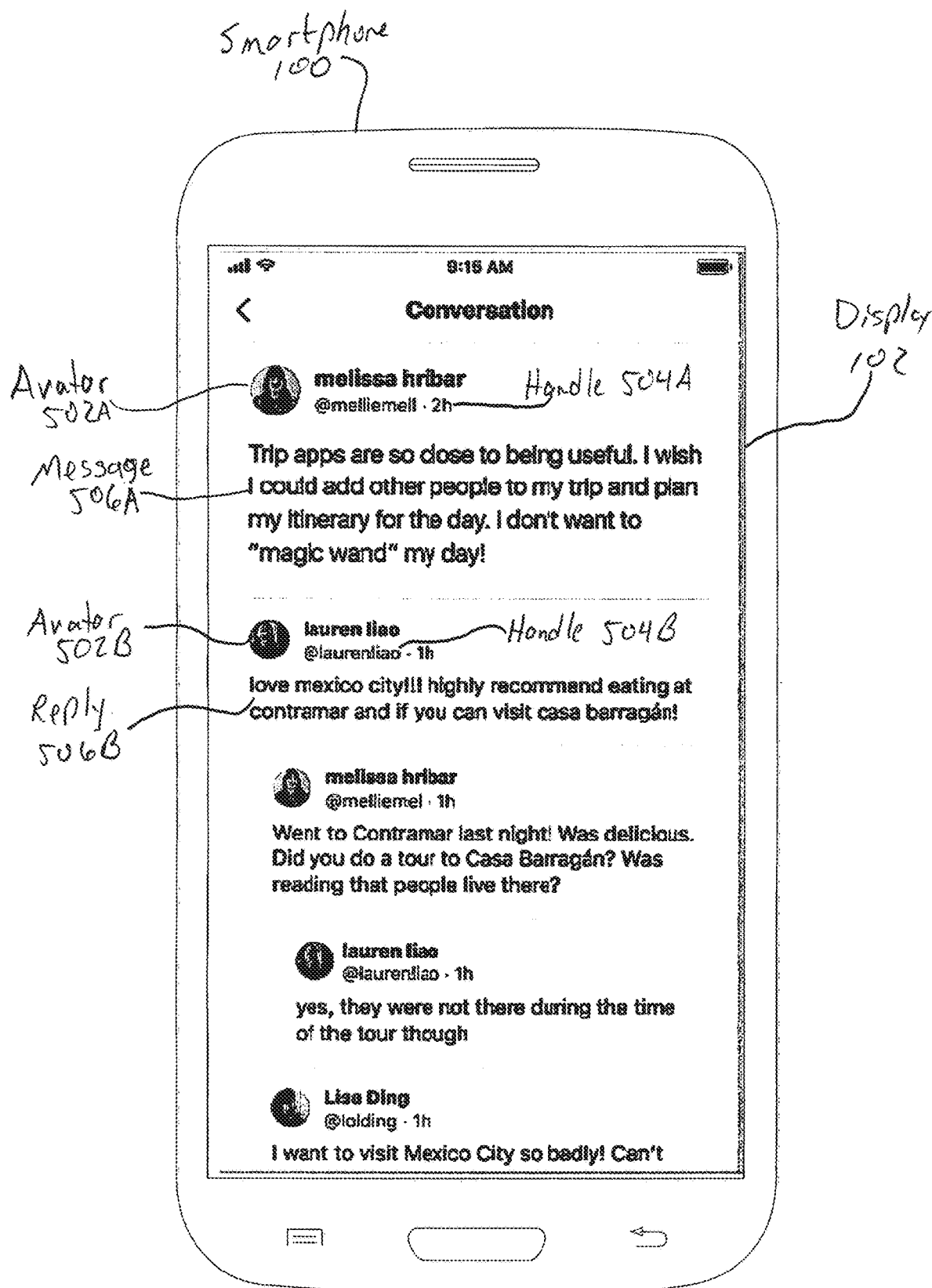

FIG. 5A shows the smartphone 100 with the display 102 presenting a conversation GUI according to an example implementation. In this example, the avatars 502A, 502B, message 506A, and reply 506B to the message 506A can be left-aligned. The indentation level of the left-alignment can indicate associations between messages 506A and replies 506B. The conversation GUI can also present handles 504A, 504B adjacent to the avatars 502A, 502B.

Figure 5B:
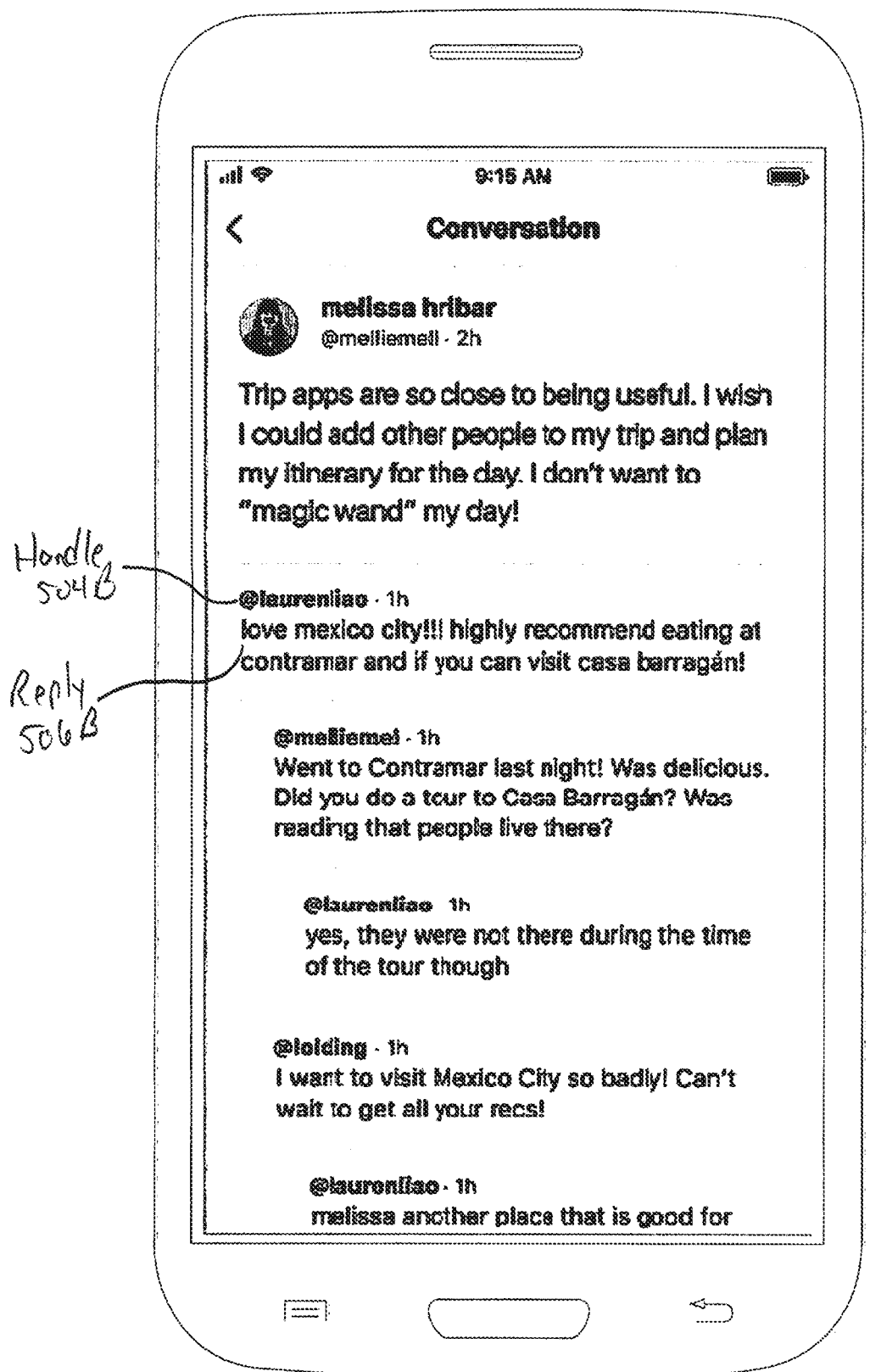

FIG. 5B shows the smartphone 100 with the display 102 presenting a conversation GUI according to an example implementation. In this example, the avatar 502B (shown in FIG. 5A) is not included in the reply 506B, condensing the appearance of the handle 504B and reply 506B.

Figure 5C:
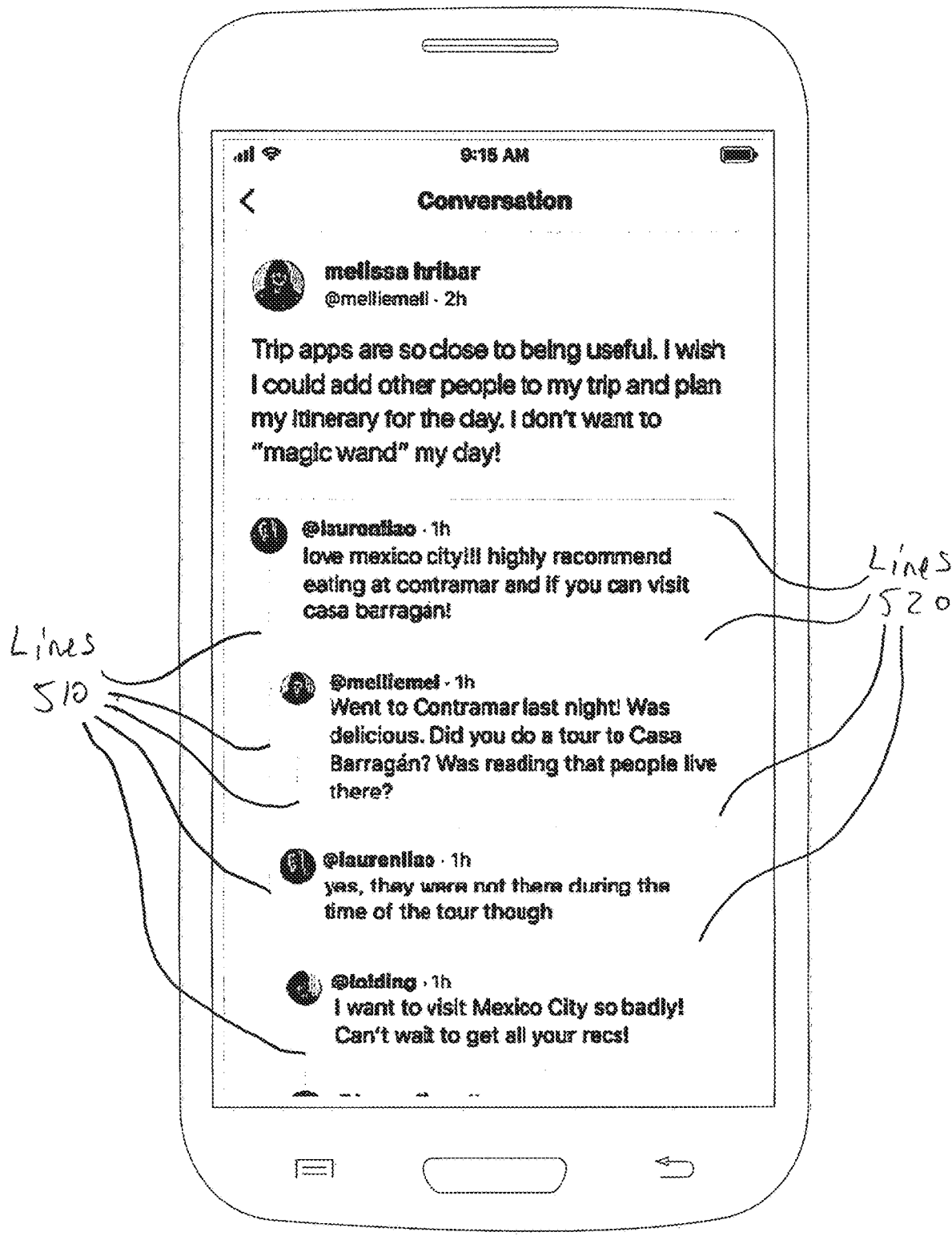

FIG. 5C shows the smartphone 100 with the display 102 presenting a conversation GUI according to an example implementation. In this example, the conversation GUI presents vertical lines 510 to indicate associations between replies. Also in this example, the conversation GUI presents horizontal lines to distinguish replies from each other.

Figure 5D:
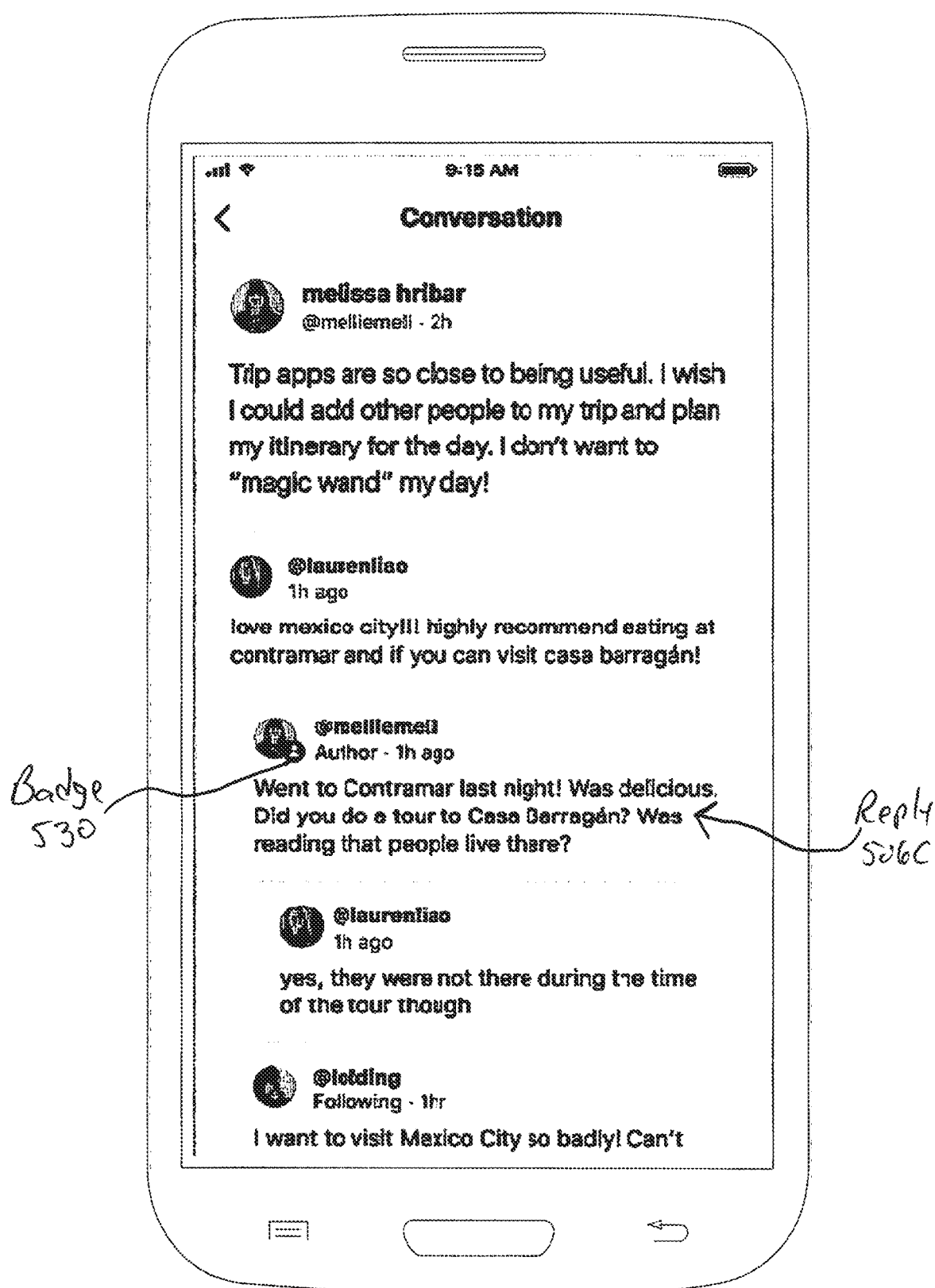

FIG. 5D shows the smartphone 100 with the display 102 presenting a conversation GUI according to an example implementation. In this example, the conversation GUI presents a badge 530 overlaying, and/or adjacent to, the avatar presented with a reply 506C that has the same author as the original message 506A. The badge 530 can indicate an important message and/or author in the conversation GUI.

Figure 6:
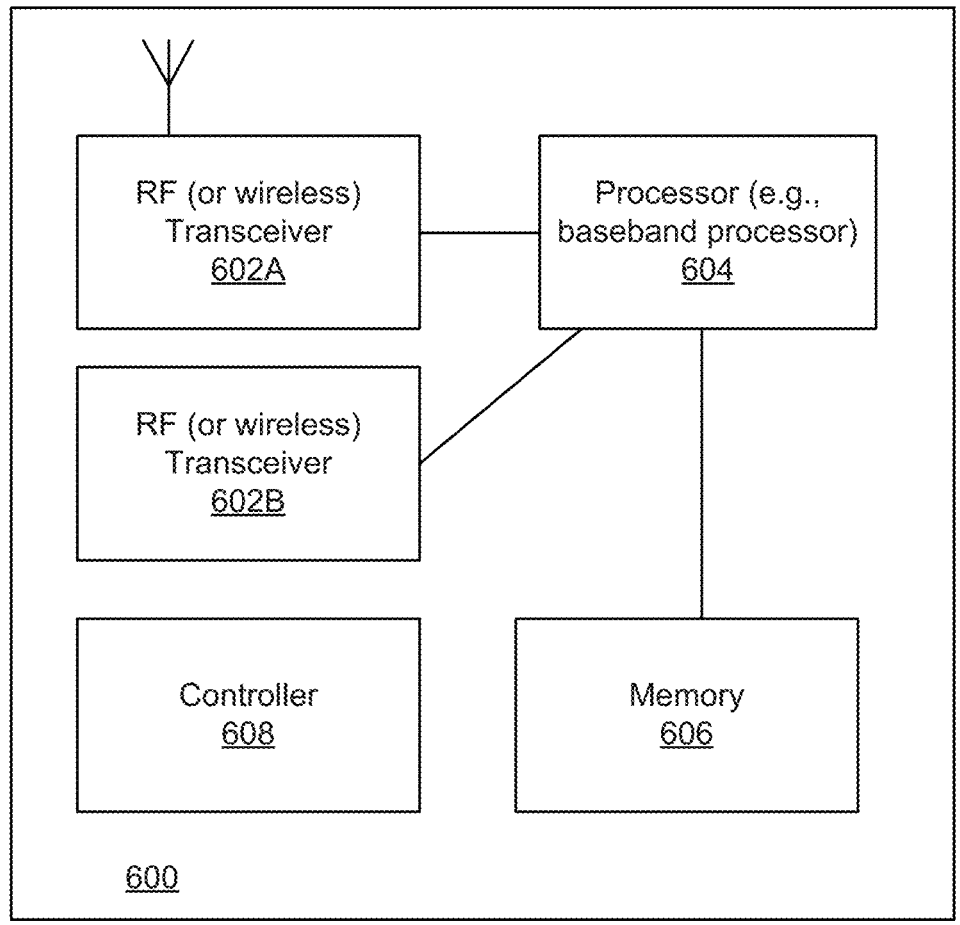
FIG. 6 shows the smartphone with at least one processor, a memory device, and an antenna according to an example implementation.

FIG. 6 shows the smartphone 100 with at least one processor, a memory device, and an antenna according to an example implementation. The smartphone 100 may include, for example, one or two RF (radio frequency) or wireless transceivers 602A, 602B, where each wireless transceiver includes a transmitter to transmit signals and a receiver to receive signals. The smartphone 100 also includes a processor 604 to execute instructions or software and control transmission and receptions of signals, and a memory device 606 to store data and/or instructions.

Processor 604 may also make decisions or determinations, generate frames, packets or messages for transmission, decode received frames or messages for further processing, respond to input from the user such as into the display 102, generate the conversation GUI, instruct the display 102 to present information and/or icons as described herein, and perform other tasks or functions described herein. Processor 604, which may be a baseband processor, for example, may generate messages, packets, frames or other signals for transmission via wireless transceiver 602. Processor 604 may control transmission of signals or messages over a wireless network, and may receive signals or messages, etc., via a wireless network (e.g., after being down-converted by wireless transceiver 602, for example). Processor 604 may be programmable and capable of executing software or other instructions stored in memory or on other computer media to perform the various methods, tasks, and/or functions described above, such as one or more of the methods, tasks, and/or functions described above. Processor 1204 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the smartphone, and may provide control for other systems not shown in FIG. 6, such as controlling input/output devices (e.g., display 102, keypad), and/or may execute software for one or more applications that may be provided on smartphone 100, such as, for example, an email program, audio/video applications, a word processor, a Voice over IP application, or other application or software.

The smartphone may also include a memory device 606. The memory 606 may include a non-transitory computer-readable storage medium. The memory 606 may store instructions that, when executed, cause the smartphone 600 to perform any combination of the methods, functions, and/or techniques described herein.

Figure 7:
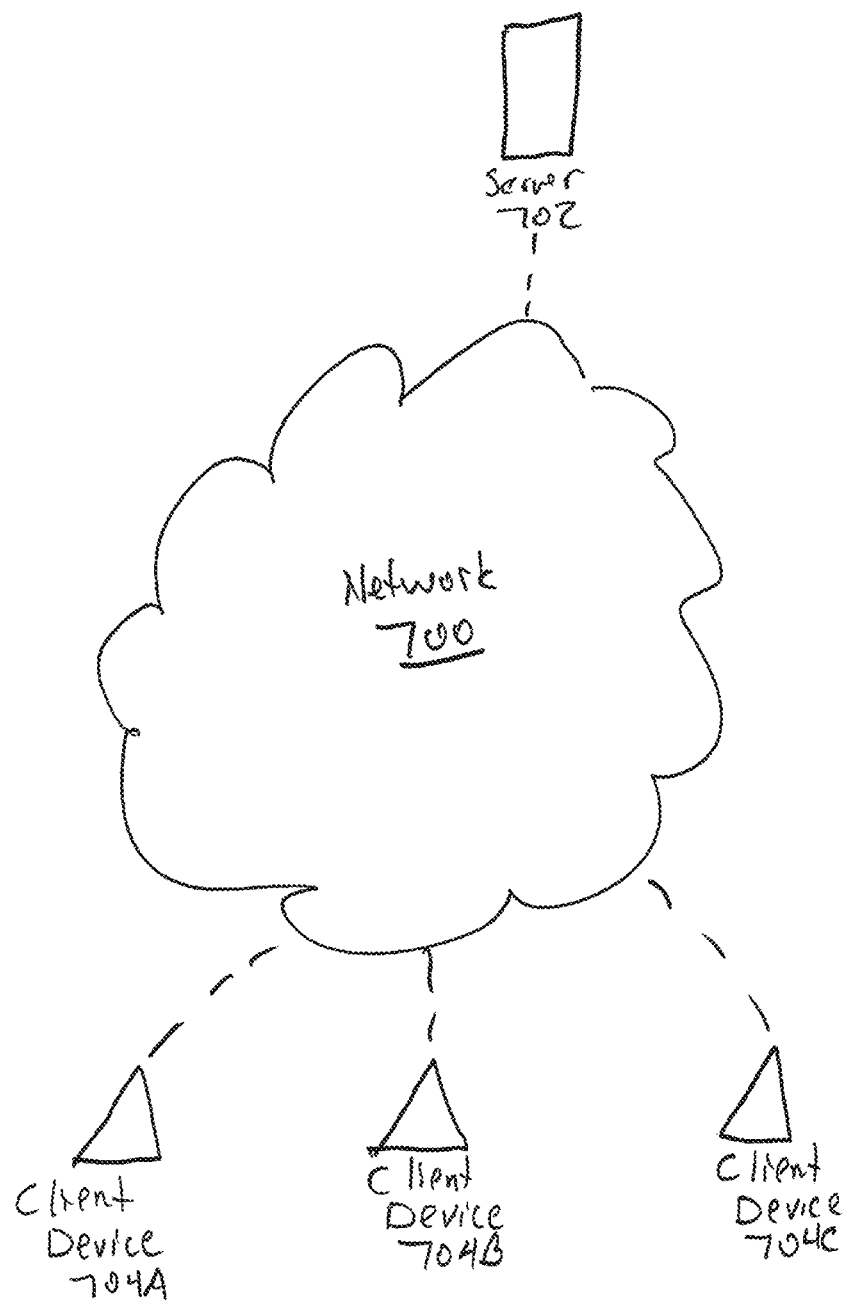
FIG. 7 is a network diagram showing a server and client devices according to an example implementation.

FIG. 7 is a network diagram showing a server 702 and client devices 704A, 704B, 704C according to an example implementation. The server 702 and client devices 704A, 704B, 704C can communicate with each other via a network 700. The network 700 can include a network via which computing devices communicate, such as a local area network, wide area network, cellular telephone network, or the Internet, as non-limiting examples. The server 702 can receive posts from client devices 704A, 704B, 704C, receive requests for posts from client devices 704A, 704B, 704C, and send posts to the client devices 704A, 704B, 704C for presentation on displays of the client devices 704A, 704B, 704C. The client devices 704A, 704B, 704C, which can include cellular communication devices such as the smartphone 100 described above, tablet computing devices, laptop computing devices, or desktop computers, as non-limiting examples, can present posts to a user, receive input from the user to generate posts and/or select posts, send generated posts and/or selections to the server 702, and present updated content, such as additional posts and/or information about posts, authors, and/or accounts, such as the selected state and/or profile card described above, based on additional content received from the server 702. While certain methods, functions, and/or techniques may be described herein with respect to either the server 702 or a client device 704A, 704B, 704C, these functions, methods, and/or techniques can be performed by either server 702 or a client device 704A, 704B, 704C, or a combination of the server 702 or a client device 704A, 704B, 704C in a distributed system.

Figure 8:
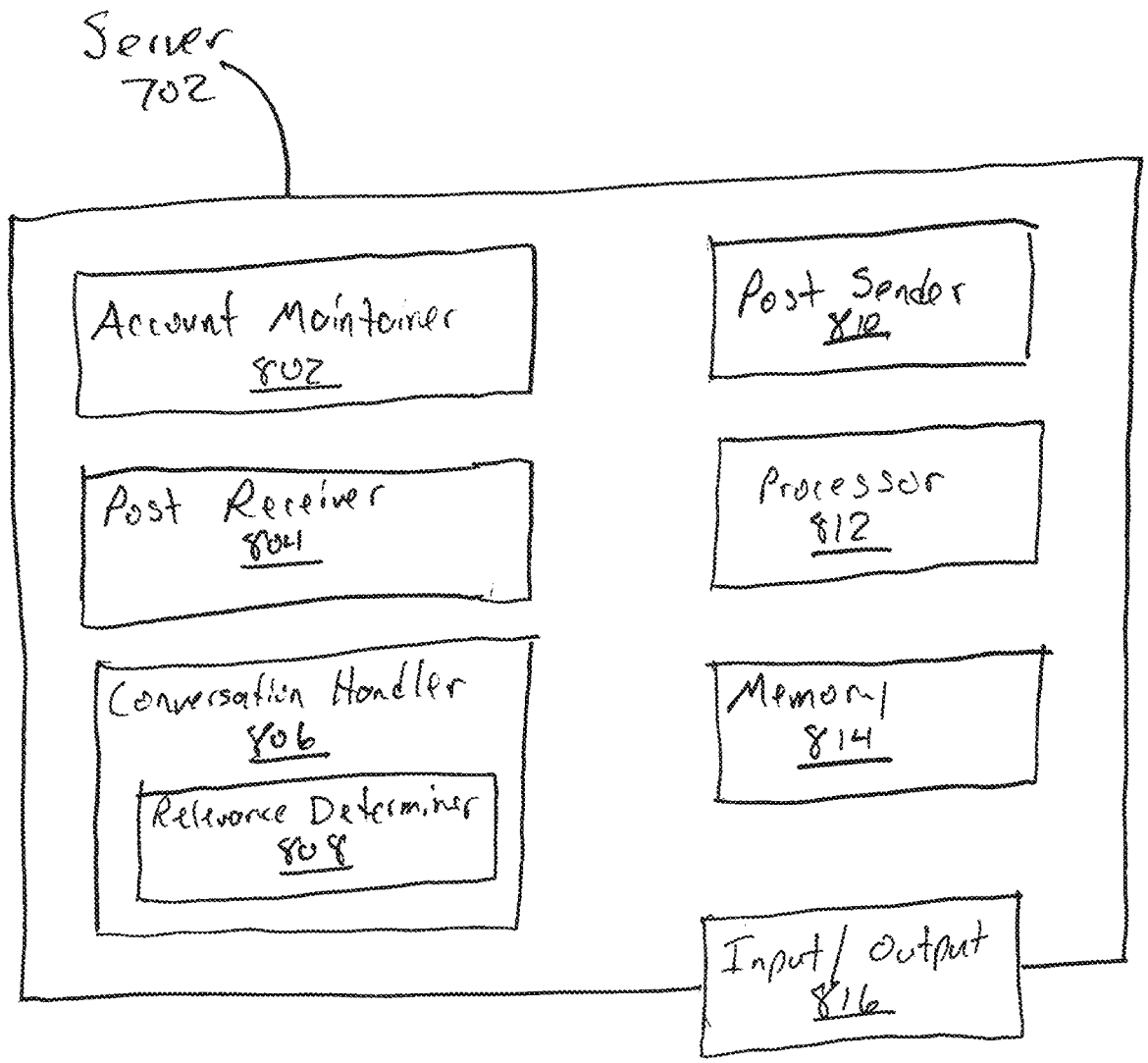
FIG. 8 is a block diagram showing the server according to an example implementation.

FIG. 8 is a block diagram showing the server 702 according to an example implementation. The server 702 can include an account maintainer 802. The account maintainer 802 can maintain, create, and/or store multiple accounts associated with multiple users. The account maintainer 802 can store, for example, an avatar, handle, and/or password for each account. The account maintainer 802 can also store posts and/or replies generated and/or uploaded by users of the accounts. The account maintainer 802 can also store other information associated with the accounts, such as dates that the accounts were created, other accounts that the account follows, a number of other accounts that follow the account, which other accounts follow the account, additional graphics associated with the account, and/or actions performed by the account such as indications of approval of posts.

The server 702 can include a post receiver 804. The post receiver 804 can receive and/or process posts, such as the posts 120A, 120B, 120C, 320A, 320B, 320C described above, from client devices 704A, 704B, 704C in association with user accounts. The posts received and/or processed by the post receiver 804 can include identifiers of the user accounts that generated and/or uploaded the posts, and content, such as text and/or images, generated and/or uploaded by the user of the account. The account maintainer 802 can store, in association with the account that generated and/or uploaded the post and/or reply, the post and/or reply received and/or processed by the post receiver 804.

The server 702 can include a conversation handler 806. The conversation handler 806 can determine which posts to include in a conversation. The conversation handler 806 can determine to include posts in a conversation based on the posts being responsive to, and/or in reply to a root post, being responsive to, and/or in reply to, a post that is responsive to and/or in reply to a root post, or being a root post. The conversation handler 806 can determine which posts within a conversation that a client device 704A, 704B, 704C should present. The conversation handler 806 can determine which posts should be presented based, for example, on a rating of the author of and/or account associated with the post, a number of responses to the post, or a determination by the server 702 that the author of and/or account associated with the post is one of two most relevant authors and/or accounts in the conversation.

The conversation handler 806 can include a relevance determiner 808. The relevance determiner 808 can determine the two most relevant authors and/or accounts in a conversation. The conversation handler 806 can instruct the client devices 704A, 704B, 704C to present and/or display only posts by the two most relevant authors and/or accounts until a user requests to see additional posts, such as by providing input to a prompt, such as the prompts 352A, 352B, 352C, 352D shown in FIG. 3A. The relevance determiner 808 can determine the two most relevant authors and/or accounts as an author and/or account of a first and/or root post in a conversation, plus an author and/or account identified in the first and/or root post, a number of posts included in the conversation that are associated with the two most relevant authors meeting and/or exceeding a threshold proportion of posts included in the conversation, based on a number of posts in the conversation that are associated with one of the first author and/or account or second author and/or account and identify the other of the first author and/or account or second author and/or account, based on a number of posts included in the conversation that are associated with either of the two most relevant authors meeting or exceeded a threshold proportion of posts in the conversation, and/or a number of posts associated with either of the two most relevant authors that are responsive to posts by the other of the two most relevant authors.

The server 702 can include a post sender 810. The post sender 316 can send posts and/or replies to the client devices 704A, 704B, 704C in response to requests for content. The post sender 810 can send, to the client devices 704A, 704B, 704C in response to requests for content, posts and/or replies that the server 702 determines are likely to be of interest to the user of the client device 704A, 704B, 704C.

The server 702 can include at least one processor 812. The at least one processor 812 can execute instructions to cause the server 702 to perform any combination of functions, methods, and/or techniques described herein.

The server 702 can include at least one memory device 814. The at least one memory device 814 can include a non-transitory computer-readable storage medium comprising instructions stored thereon that, when executed by the at least one processor 814, are configured to cause a computing system such as the server 702 to perform any combination of functions, methods, and/or techniques described herein.

The server 702 can include at least one input/output node 816. The at least one input/output node 816 can include input nodes for receiving input from a user, such as a touchscreen, microphone, buttons, a keyboard, and/or a mouse, as non-limiting examples. The at least one input/output node 816 can include output nodes for providing output to a user such as an administrator, such as a display and/or speaker, as non-limiting examples. The at least input/output node 816 can include nodes for communicating with other computing devices such as the client devices 704A, 704B, 704C via access points and/or base stations, such as wired interfaces including an Institute for Electrical and Electronics Engineers (IEEE) 802.3 Ethernet Port, a High-Definition Multimedia Interface (HDMI) port, or a Universal Serial Bus (USB) port, as non-limiting examples, and/or wireless interfaces such as IEEE 802.11 Wireless Fidelity interfaces, Long-term Evolution (LTE) interfaces, or other cellular communication interfaces, as non-limiting examples.

Figure 9:
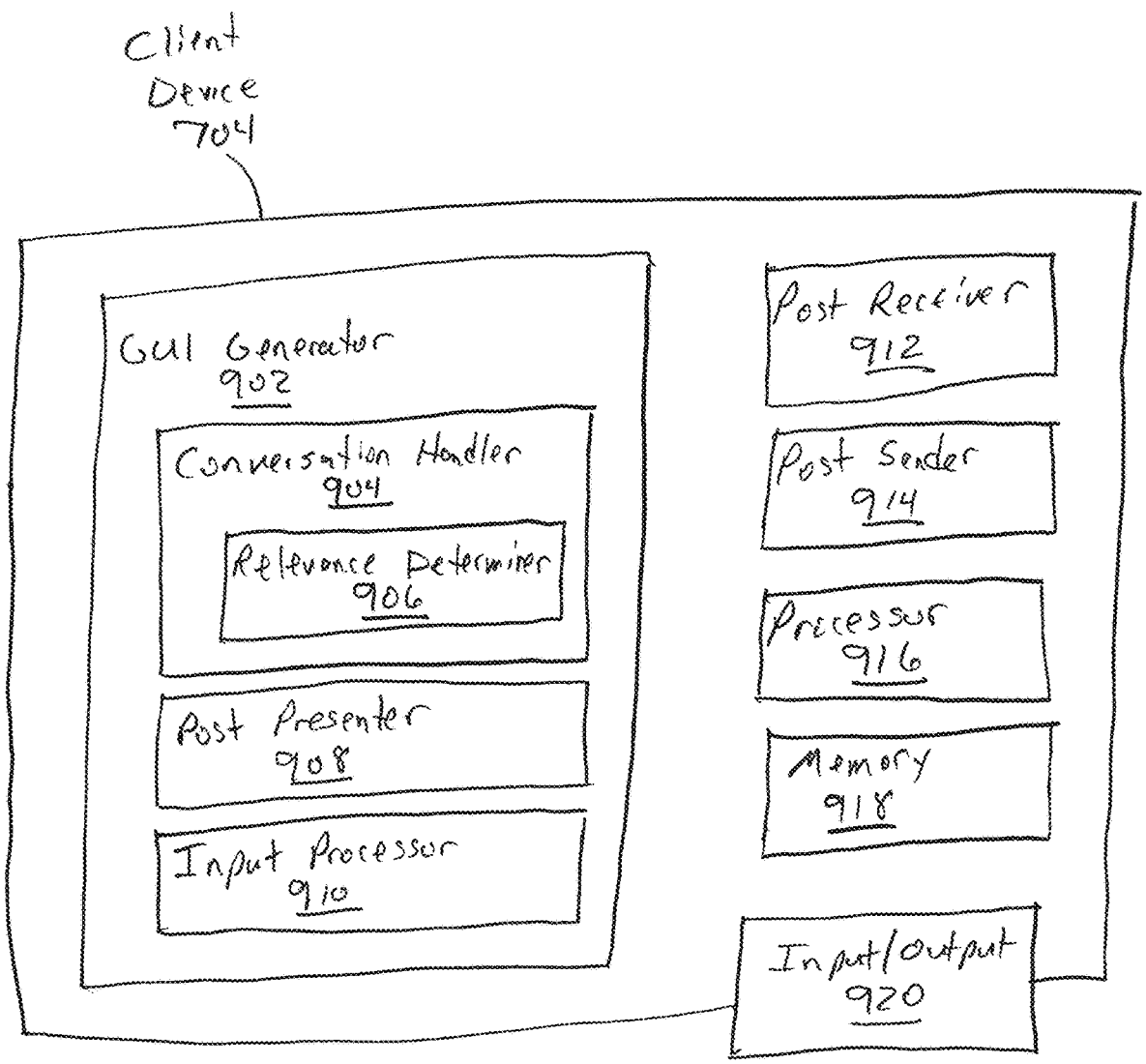
FIG. 9 is a block diagram showing a client device according to an example implementation.

FIG. 9 is a block diagram showing a client device 704 according to an example implementation. The client device 704 can be an example of the smartphone 100 and/or any of the client devices 704A, 704B, 704C.

The client device 704 can include a graphical user interface (GUI) generator 902. The GUI generator 902 can generate a GUI that presents the posts and/or replies, such as posts 120A, 120B, 120C, 320A, 320B, 320C, 320D, 320E, and receives input such as generation of posts by the user.

The GUI generator 902 can include a conversation handler 904 and a relevance determiner 906. The conversation handler 904 and relevance determiner 906 can have similar features as the conversation handler 806 and relevance determiner 808 described above with respect to the server 702.

The GUI generator 902 can include a post presenter 908. The post presenter 404 can present posts, such as posts 120A, 120B, 120C, 320A, 320B, 320C, 320D, 320E, to the user via the display 102. The posts that the post presenter 908 presents to the user can be posts that the client device 704 received from the server 702.

The GUI generator 902 can include an input processor 910. The input processor 910 can receive and/or process input from the user. The input processor 406 can receive and/or process selections of posts and/or replies, and/or selections and/or inputs of prompts 352A, 352B, 352C, 352D. The input processor 910 can receive and/or process the selections of posts and/or replies by, for example, receiving and/or processing a touch contact on a portion of the display 102 presenting and/or associated with the selected post and/or reply, the user moving a cursor and clicking on a portion of the display 102 presenting and/or associated with the selected post and/or reply, and/or a user scrolling through posts and/or replies and selecting a post and/or reply by input into a human interface device such as tapping on the display 102, clicking on a mouse, and/or typing a specific key on a keyboard or keypad.

The input processor 910 can receive and/or process generation of posts and/or replies by the user. The input processor 910 can receive, for example, textual input, such as via a soft keyboard on a touchscreen included in the display 102, text input via a keyboard, or voice input via a microphone. In some examples, the input processor 910 can receive and/or process images, such as photographs stored on the client device 704 and/or captured by a camera included in the client device 704, or graphical images generated and/or stored on the client device 704, as non-limiting examples.

The client device 704 can include a post receiver 912. The post receiver 912 can receive posts from the server 702. The posts that the client device 704 receives from the server 702 can include, for example, an identifier of the author or and/or account associated with the post, an avatar associated with the author and/or account, a name and/or handle associated with the handle and/or account, content such as text 130 and/or image 132 included in the post, and/or relationships between the post and other posts, such as which posts the post is responsive and/or replying to and/or which posts are responsive and/or replying to the post.

The client device 704 can include a post sender 914. The post sender 914 can send, to the server 702, posts and/or replies created and/or inputted by the user via the input processor 910 of the GUI generator 902. The post sender 914 can send posts and/or replies that include an identification of the account associated with the user who created and/or inputted the post, as well as the content including text and/or image(s).

The client device 704 can include at least one processor 916. The at least one processor 916 can execute instructions to cause the client device 704 to perform any combination of functions, methods, and/or techniques described herein.

The client device 704 can include at least one memory device 918. The at least one memory device 918 can include a non-transitory computer-readable storage medium comprising instructions stored thereon that, when executed by the at least one processor 916, are configured to cause a computing system such as the client device 704 to perform any combination of functions, methods, and/or techniques described herein.

The client device 704 can include at least one input/output node 920. The at least one input/output node 920 can include input nodes for receiving input from a user, such as a touchscreen included in the display 102, microphone, buttons, a keyboard, and/or a mouse, as non-limiting examples. The at least one input/output node 920 can include output nodes for providing output to a user, such as a display 102 and/or speaker, as non-limiting examples. The at least input/output node 920 can include nodes for communicating with other computing devices such as the server 702 via access points and/or base stations, such as wired interfaces including an Institute for Electrical and Electronics Engineers (IEEE) 802.3 Ethernet Port, a High-Definition Multimedia Interface (HDMI) port, or a Universal Serial Bus (USB) port, as non-limiting examples, and/or wireless interfaces such as IEEE 802.11 Wireless Fidelity interfaces, Long-term Evolution (LTE) interfaces, or other cellular communication interfaces, as non-limiting examples.

Figure 10:
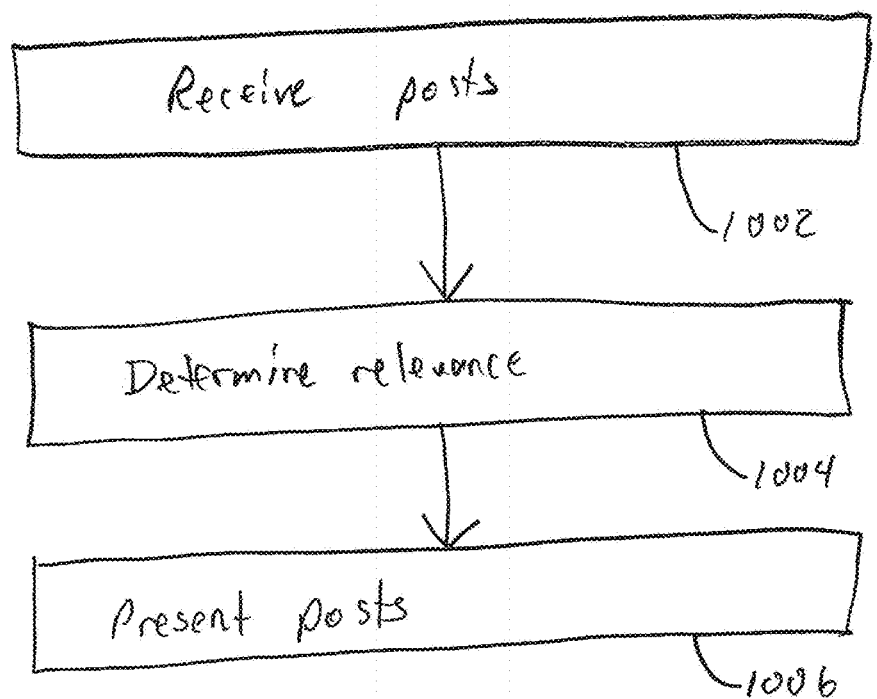
FIG. 10 is a flowchart showing a method according to an example implementation.

FIG. 10 is a flowchart showing a method according to an example implementation. The method can include receiving posts (1002). Receiving posts (1002) can include receiving at least a first post in association with a first account, a second post in association with the first account, the second post being associated with the first post, a third post in association with a second account, the third post being associated with the first post, a fourth post in association with the second account, the fourth post being associated with the first post, and a fifth post in association with a third account, the fifth post being associated with the first post. The method can include determining relevance of accounts associated with the posts (1004). Determining the relevance of accounts associated with the posts (1004) can include determining that the first account and the second account are most relevant to a conversation, the conversation including at least the first post, the second post, the third post, the fourth post, and the fifth post. The method can include presenting posts (1006). Presenting posts (1006) can include, based on determining that the first account and the second account are most relevant to the conversation, presenting the first post, the second post, the third post, and the fourth post without presenting the fifth post.

According to an example, the first post can identify the second account, and the determining that the first account and the second account are most relevant to the conversation can be based on the first post identifying the second account.

According to an example, the determining that the first account and the second account are most relevant to the conversation can be based on a number of posts included in the conversation that are associated with either the first account or the second account meeting or exceeding a threshold proportion of posts included in the conversation.

According to an example, the determining that the first account and the second account are most relevant to the conversation can be based on a number of posts included in the conversation that were either received in association with the first account and identify the second account or were received in association with the second account and identify the second account meeting or exceeding a threshold proportion of posts included in the conversation.

According to an example, the determining that the first account and the second account are most relevant to the conversation can be based on a number of posts included in the conversation that were either received in association with the first account and identify the second account or were received in association with the second account and identify the second account meeting or exceeding a threshold proportion of posts received in association with either the first account or the second account.

According to an example, the determining that the first account and the second account are most relevant to the conversation can be based on a number of posts associated with the first account that are responsive to posts associated with the second account and posts associated with the second account that are responsive to posts associated with the first account.

According to an example, the receiving the first post in association with the first account can include receiving a message, the message including the first post and identifying the first account as an author of the first post.

According to an example, the presenting the first post, the second post, the third post, and the fourth post without presenting the fifth post can include presenting posts received in association with either the first account or the second account without presenting posts received in association with accounts other than the first account or the second account.

According to an example, the presenting the first post, the second post, the third post, and the fourth post without presenting the fifth post can include presenting the first post with a first color identifying the first account, the second post with the first color identifying the first account, the third post with a second color identifying the second account, and the fourth post with the second color identifying the second account.

According to an example, the method can further include presenting a prompt to display additional posts, and, in response to receiving input to the prompt, presenting the fifth post.

Figure 11:
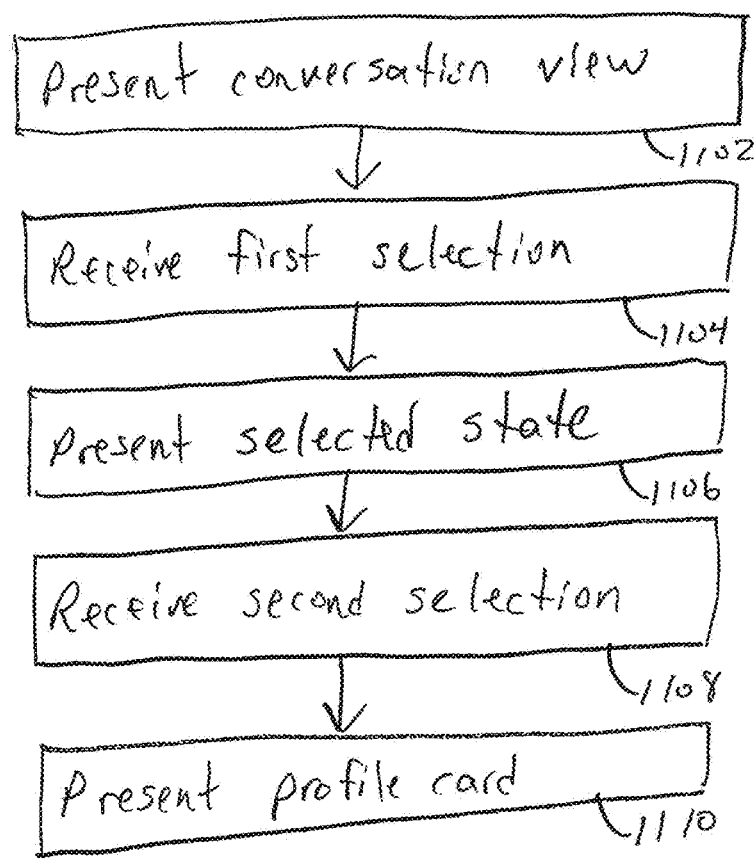
FIG. 11 is a flowchart showing a method according to another example implementation.

FIG. 11 is a flowchart showing a method according to another example implementation. The method can include presenting a conversation view (1102). Presenting the conversation view (1102) can include presenting, within the conversation view, a first post and at least one other post, the first post including an identifier of an author of the first post and content provided by the author of the first post. The method can include receiving a first selection (1104). Receiving the first selection (1104) can include receiving the first selection of the first post within the conversation view. The method can include presenting a selected state (1106). Presenting the selected state (1106) can include, in response to receiving the first selection of the first post within the conversation view, present the first post within the selected state, at least one of the identifier of the author or the content being presented larger in the selected state than in the conversation view. The method can include receiving a second selection (1108). Receiving the second selection (1108) can include receiving the second selection of the first post within the selected state. The method can include presenting a profile card (1110). Presenting the profile card (1110) can include, in response to receiving the second selection of the first post within the selected state, presenting the profile card associated with the author, the profile card including the identifier of the author and a description of the author.

According to an example, the method can further include processing a first return input after presenting the profile card, and, in response to processing the first return input, presenting the first post within the selected state.

According to an example the first return input can include an input into a portion of a display that is outside the profile card.

According to an example, the method can further include processing a second return input after presenting the first post within the selected state in response to processing the first return input, and after processing the second return input, presenting the first post and at least one other post in the conversation view.

According to an example, the second return input can include an input into a portion of a display that is presenting the content.

According to an example, the first selection can include an input into a portion of a display that is presenting the first post.

According to an example, the second selection can include an input into a portion of a display that is presenting the identifier of the author.

According to an example, the content can include text.

According to an example, the content can include at least one image.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A non-transitory computer-readable storage medium comprising instructions stored thereon that, when executed by at least one processor, are configured to cause a computing device to:
   receive at least a first post and a second post authored by a first account, the second post replying to the first post, a third post and a fourth post authored by a second account, the third post and the fourth post replying to the first post, and a fifth post authored by a third account, the fifth post replying to the first post, the first post including an identifier that identifies the second account;
   determine that the first account and the second account are most relevant to a conversation based on:
      the first post being a root post in the conversation, the first post being authored by the first account, and the first post including the identifier that identifies the second account, the conversation including at least the first post, the second post, the third post, the fourth post, and the fifth post; and
      a number of posts authored by the first account that include identifiers that identify the second account and a number of posts authored by the second account that include identifiers that identify the first account meeting or exceeding a threshold proportion of posts in the conversation that were authored by the first account and posts that were authored by the second account; and
   based on the determining that the first account and the second account are most relevant to the conversation, present the first post, the second post, the third post, and the fourth post without presenting the fifth post.

2. The non-transitory computer-readable storage medium of claim 1, wherein the determining that the first account and the second account are most relevant to the conversation is also based on a number of posts included in the conversation that are authored by either the first account or the second account meeting or exceeding a threshold proportion of posts included in the conversation.

3. The non-transitory computer-readable storage medium of claim 1, wherein the determining that the first account and the second account are most relevant to the conversation is also based on a number of posts included in the conversation that were authored by the first account that include identifiers identifying the second account and a number of posts authored by the second account that include identifiers identifying the first account meeting or exceeding a threshold proportion of posts included in the conversation.

4. The non-transitory computer-readable storage medium of claim 1, wherein the determining that the first account and the second account are most relevant to the conversation is also based on a number of posts authored by the first account that are responsive to posts authored by the second account and posts authored by the second account that are responsive to posts authored by the first account.

5. The non-transitory computer-readable storage medium of claim 1, wherein the receiving the first post authored by the first account comprises receiving a message, the message including the first post and identifying the first account as an author of the first post.

6. The non-transitory computer-readable storage medium of claim 1, wherein the presenting the first post, the second post, the third post, and the fourth post without presenting the fifth post comprises presenting posts authored by either the first account or the second account without presenting posts authored by accounts other than the first account or the second account.

7. The non-transitory computer-readable storage medium of claim 1, wherein the presenting the first post, the second post, the third post, and the fourth post without presenting the fifth post comprises presenting the first post with a first color identifying the first account, the second post with the first color identifying the first account, the third post with a second color identifying the second account, and the fourth post with the second color identifying the second account.

8. The non-transitory computer-readable storage medium of claim 1, wherein the instructions are further configured to cause the computing device to:
   present a prompt to display additional posts; and
   in response to receiving input to the prompt, present the fifth post.

9. The non-transitory computer-readable storage medium of claim 1, wherein:
   the first post includes text and the identifier, the identifier identifying the second account; and
   the determination that the first account and the second account are most relevant to the conversation is also based on the identifier included in the first post that identifies the second account being after the text.

10. A method performed by a computing device, the method comprising:

receiving at least a first post and a second post authored by a first account, the second post replying to the first post, a third post and a fourth post authored by a second account, the third post and fourth post replying to the first post, and a fifth post authored by a third account, the fifth post replying to the first post, the first post including an identifier that identifies the second account;

determining that the first account and the second account are most relevant to a conversation based on:

the first post being a root post in the conversation, the first post being authored by the first account, and the first post including the identifier that identifies the second account, the conversation including at least the first post, the second post, the third post, the fourth post, and the fifth post; and a number of posts authored by the first account that include identifiers that identify the second account and a number of posts authored by the second account that include identifiers that identify the first account meeting or exceeding a threshold proportion of posts in the conversation that were authored by the first account and posts that were authored by the second account; and based on the determining that the first account and the second account are most relevant to the conversation, presenting the first post, the second post, the third post, and the fourth post without presenting the fifth post.

11. The method of claim 10, wherein the determining that the first account and the second account are most relevant to the conversation is also based on a number of posts included in the conversation that are authored by either the first account or the second account meeting or exceeding a threshold proportion of posts included in the conversation.

12. The method of claim 10, wherein the determining that the first account and the second account are most relevant to the conversation is based on a number of posts included in the conversation that were either authored by the first account and include identifiers identifying the second account or were authored by the second account and include identifiers identifying the first account meeting or exceeding a threshold proportion of posts included in the conversation.

13. The method of claim 10, wherein the determining that the first account and the second account are most relevant to the conversation is also based on a number of posts authored by the first account that are responsive to posts authored by the second account and posts authored by the second account that are responsive to posts authored by the first account.

14. The method of claim 10, wherein the receiving the first post authored by the first account comprises receiving a message, the message including the first post and identifying the first account as an author of the first post.

15. The method of claim 10, wherein the presenting the first post, the second post, the third post, and the fourth post without presenting the fifth post comprises presenting posts authored by either the first account or the second account without presenting posts authored by accounts other than the first account or the second account.

16. The method of claim 10, wherein the presenting the first post, the second post, the third post, and the fourth post without presenting the fifth post comprises presenting the first post with a first color identifying the first account, the second post with the first color identifying the first account, the third post with a second color identifying the second account, and the fourth post with the second color identifying the second account.

17. The method of claim 10, wherein the method further includes:

presenting a prompt to display additional posts; and in response to receiving input to the prompt, presenting the fifth post.

18. The method of claim 10, wherein:

the first post includes text and the identifier after the text, the identifier identifying the second account; and the determination that the first account and the second account are most relevant to the conversation is also based on the identifier included in the first post that identifies the second account being after the text.

* * * * *